(12) United States Patent
Hagenbuch

(10) Patent No.: US 8,770,651 B2
(45) Date of Patent: Jul. 8, 2014

(54) OFF-HIGHWAY TRUCK BODY FLOOR DESIGN

(76) Inventor: LeRoy G. Hagenbuch, Peoria Heights, IL (US)

( * ) Notice: Subject to any disclaimer, the term of this patent is extended or adjusted under 35 U.S.C. 154(b) by 0 days.

(21) Appl. No.: 13/589,805

(22) Filed: Aug. 20, 2012

(65) Prior Publication Data

US 2013/0043701 A1 Feb. 21, 2013

Related U.S. Application Data

(60) Provisional application No. 61/525,681, filed on Aug. 19, 2011, provisional application No. 61/525,691, filed on Aug. 19, 2011.

(51) Int. Cl.
*B62D 25/20* (2006.01)

(52) U.S. Cl.
CPC ............ *B62D 25/20* (2013.01); *B62D 25/2045* (2013.01)
USPC ...................................... 296/184.1

(58) Field of Classification Search
CPC ........................... B62D 25/20; B62D 25/2045
USPC ................. 296/193.07, 184.1, 204, 193.08, 296/187.11, 37.2; 29/897.2; 105/413, 420
See application file for complete search history.

(56) References Cited

U.S. PATENT DOCUMENTS

| | | | |
|---|---|---|---|
| 2,734,117 A | 2/1956 | Randall | |
| 3,923,337 A * | 12/1975 | Kershaw et al. | 296/183.2 |
| 4,545,172 A | 10/1985 | Wardill | |
| 4,563,957 A * | 1/1986 | Billingsley et al. | 105/418 |
| 4,875,417 A * | 10/1989 | Coulborn et al. | 105/248 |
| 6,092,862 A * | 7/2000 | Kuwahara | 296/184.1 |
| 6,612,643 B1 | 9/2003 | McWilliams | |
| 7,082,685 B2 * | 8/2006 | Crean | 29/897.2 |
| 7,901,009 B2 | 3/2011 | Hagenbuch | |
| 2007/0063543 A1 | 3/2007 | Roccato et al. | |
| 2009/0108633 A1 | 4/2009 | Ohi et al. | |
| 2009/0309387 A1 * | 12/2009 | Goral et al. | 296/187.03 |
| 2009/0320398 A1 * | 12/2009 | Gouvea | 52/309.1 |
| 2011/0044790 A1 | 2/2011 | Railsback | |

OTHER PUBLICATIONS

Co-pending International Application No. PCT/US2012/051607 International Search Report dated Nov. 2, 2012.

* cited by examiner

*Primary Examiner* — Glenn Dayoan
*Assistant Examiner* — Pinel Romain
(74) *Attorney, Agent, or Firm* — Leydig, Voit & Mayer, Ltd.

(57) ABSTRACT

A truck body floor includes a truck body floor frame and a floor plate attached to and supported by the truck body floor frame. The truck body floor frame includes two frame rails extending along a longitudinal length of the truck body floor, and a plurality of bolster structures attached to both of the two frame rails and extending across a width of the truck body floor. The plurality of bolster structures includes at least one layered bolster structure having an inner bolster and an outer bolster that is at least partially flush with and attached to the inner bolster.

19 Claims, 24 Drawing Sheets

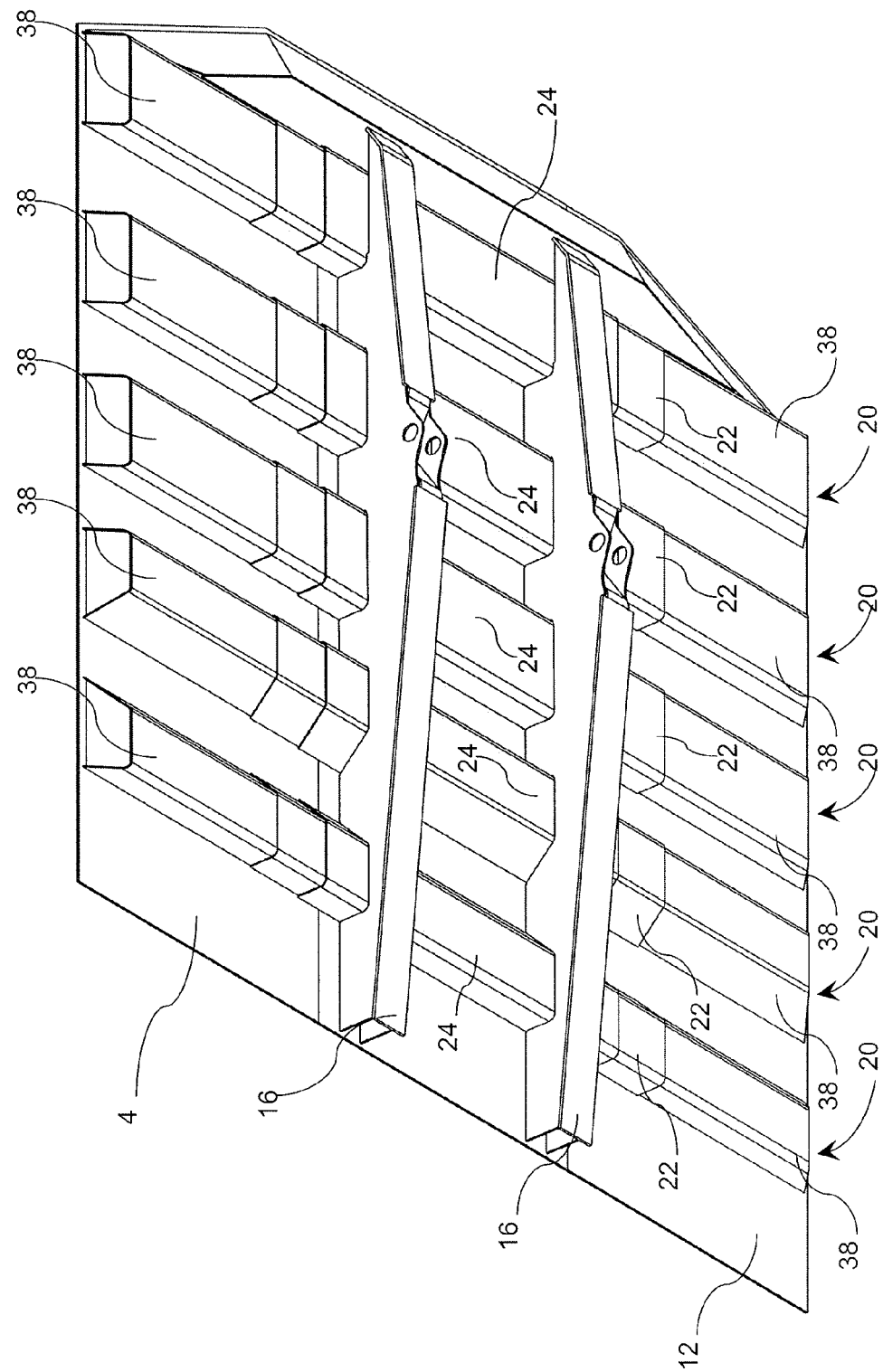

OFF-HIGHWAY TRUCK BODY FLOOR DESIGN

CROSS REFERENCE TO RELATED APPLICATIONS

This patent application claims the benefit of U.S. Provisional Patent Application No. 61/525,691, filed Aug. 19, 2011, and U.S. Provisional Patent Application No. 61/525,681, filed Aug. 19, 2011, which are incorporated by reference.

TECHNICAL FIELD OF THE INVENTION

The present invention generally relates to an off-highway truck body and more particularly to the floor and sides of such an off-highway truck body.

BACKGROUND OF THE INVENTION

Off-highway trucks, such as those of the present invention, are typically used in quarries, steel mills, power plants, mines, and landfills. Off-highway trucks of this type can often carry or haul two hundred (200) to four hundred (400) ton plus payloads, which in truck body volume can translate from as much as one hundred sixty (160) cubic yards to three hundred twenty (320) cubic yards (and greater) in size. (To put this into perspective, a typical on-highway tandem axle dump truck is ten (10) cubic yards in size.) As such, the floors of the bodies on such off-highway trucks can easily be greater than sixteen (16) feet wide and often can exceed thirty (30) feet wide.

Off-highway trucks with carrying capacities of four hundred (400) tons or more are commonly used for hauling a variety of materials in various off road environments. As the generic name, "off-highway", implies these vehicles are limited to off-highway, private road use and are typically used in mining environments. The typical norm for these off-highway vehicles is to operate on unpaved gravel or aggregate roads of varying quality. As mining operations in particular advance, new temporary roads are continually being constructed and old roads are abandoned. Thus, such 'mine' roads can be undulating and at times have extremely soft/poor under footing; causing the chassis of the off-highway trucks operating on these roads to twist and/or turn and at times rack their very frames along with the truck bodies sitting on the off-highway truck chassis.

The loading of these off-highway trucks, particularly with two hundred (200) to four hundred (400) ton plus payloads, needs to be carried out efficiently and quickly for the owners of such off-highway trucks to achieve the needed return on investment and payback on their off-highway trucks. A typical cost for these off-highway trucks is between twelve thousand ($12,000.00) and sixteen thousand ($16,000.00) dollars per ton of hauling capacity, such that a two hundred (200) ton hauling capacity off-highway truck might cost about $2,800,000.00 and a four hundred (400) ton capacity off-highway truck might cost about $5,600,000.00.

When one considers the costs for such off-highway trucks, the 'hourly' owning operating cost of such vehicles is in the 'range', for a two hundred (200) ton capacity truck, of about $220.00 per hour and, for a four hundred (400) ton truck, of about $380.00 per hour. Considering these owning—operating cost rates, it is ideal for these off-highway trucks to be operating and hauling as much material as possible each and every hour of operation. Consequently, at about $3.70 and $6.30 per operating minute, in the above examples, every minute that the trucks are not moving material comes at a real and quantifiable expense.

A typical off-highway truck haul cycle includes:
a. Loading,
b. Hauling the load to a dump point,
c. Dumping the load, and
d. Returning to a loading point for the next load.

Typical complete haul cycles can be anywhere from fifteen (15) minutes to over sixty (60) minutes. The typical haul cycle is fifteen (15) to twenty (25) minutes. Assuming an average twenty (20) minute haul cycle, the loading of an off-highway truck should be quick and efficient, as every minute spent by an off-highway truck being loaded adds a minute to the total vehicle haul cycle.

In typical off-highway truck high-production haulage operations the goal is to have a vehicle loaded in three (3) to four (4) minutes or less. Typical off-highway truck loading tools, whether they be large power shovels (either cable operated or hydraulic operated) or front end loaders, have a forty five (45) second to one (1) minute loading cycle. Thus by straight forward calculation to fill a four hundred (400) ton nominal capacity off-highway truck in three (3) to four (4) minutes will require four (4) to a maximum of five (5) shovel passes. For a nominal four hundred (400) ton capacity truck this means shovel or loader bucket capacities of at least eighty (80) to one hundred ten (110) tons per pass. Today, such shovel bucket capacities are achievable with loading shovels such as P&H 4100 or Caterpillar 7495 electric rope shovels.

With a loading shovel 'bucket' of a nominal one hundred (100) ton capacity to load a four hundred (400) ton capacity truck in a minimal amount of time, extremely significant truck body floor loading 'impacts' will occur as one hundred (100) ton plus buckets of material are repeatedly dropped on the truck body floor. These loading 'impacts' normally occur at or near the longitudinal center of the truck body floor. This area of the truck body floor, that is regularly load 'impacted' by material, can be referred to as the "sweet spot" of a truck body floor. Further, since off-highway truck bodies are normally "open ended" to facilitate the dumping out of hauled material, the truck body floor "sweet spot" typically extends along the center of the truck body floor from a short distance behind the truck body front wall rearward to a position slightly behind the off-highway truck chassis 'dump body pivot' or hinge connection.

The intensity of loading impacts on the truck body floor "sweet spot" is partially determined by the actual materials being loaded into and hauled by the off-highway truck body. For example:
1. Material such as plain alluvial dirt which rarely freezes into solid chunks (e.g., in more temperate climates) will cause relatively mild truck body floor impact
2. Material that has low tensile strength, such as coal that easily breaks up on impact, causes only mild truck body floor impact
3. Material that does break up relatively easy; but, contains little abrasive materials will be fairly easy on a truck body floor
4. Material that will break up when thrown against itself is only marginally harder on a truck body floor
5. Material that has high tensile strength and only breaks up in a mechanical crusher will impact a truck body floor life considerably more
6. Material that does not easily break up other than when mechanically crushed and that has highly abrasive qualities (such as having silica sand or quartz content) impacts the truck body floor "sweet spot" fairly extremely The floors of high-capacity off-highway truck bodies range in width from a nominal twenty (20) feet, up to and in excess of thirty (30) feet in width. With truck body floor structures of this width it is very important that the anchor and corresponding interconnections between the truck body floor and off-highway truck chassis are extremely substantial.

Rear dump, truck body floors typcially interface with an off-highway truck chassis at a minimum of at least four different points including:
1. the truck body to off-highway truck 'dump chassis pivot' or hinge point, that the truck body pivots about when dumping,
2. the truck body 'frame rails' which sit on the off-highway truck chassis and may be disposed on rubber frame pads between the body frame rails and off-highway truck chassis,
3. at the truck chassis hydraulic hoist, where body hydraulic dump cylinders connect to the truck body, and
4. some point near the front of the truck body via a chassis—body guide or stabilizer, that is disposed on the underside of the truck body floor and/or on the outside front wall of the truck body.

Of these four points between the truck body to off-highway truck chassis interface, only the truck body to truck chassis 'dump body pivot' interfaces and constrains/retains the truck body on the off-highway truck chassis. As such, to keep a truck dump body from falling off of the off-highway truck chassis, tremendous dynamic loads in the truck body to chassis pivot area do occur in maintaining truck body stability on the off-highway truck chassis.

Such dynamic loads occur in normal off-highway truck operation, as the off-highway truck traverses undulating and curved off-highway truck haul roads. These dynamic forces can often be further exacerbated by a commonplace off center truck body loading condition. In fact, it is rare that in loading an off-highway truck body, the loads will be perfectly centered on the off-highway truck body/chassis.

On a typical two hundred forty (240) ton capacity off-highway truck with a truck body floor width approaching twenty five (25) feet the actual truck body pivots are only slightly more than five (5' 3") feet apart. Further, on a four hundred (400) ton capacity off-highway truck with a truck body floor width of around thirty (30) feet, the truck body pivots are only about seven and one half (7' 6") feet apart. Comparing an off-highway truck body floor width with the width of the truck body to chassis anchor point, it is relatively easy to recognize that significant cantilever stresses occur at the truck chassis to truck body anchor or pivot points, with these cantilever stresses being further amplified by any off center truck body load placement.

In fact, on a two hundred forty (240) ton capacity off-highway truck there is typically about ten (10) feet of body floor cantilevered on either side of the off-highway truck chassis body support, and on a four hundred (400) ton capacity off-highway truck there is often more than eleven (11) feet of body floor cantilevered to either side of the off-highway truck chassis body support. Of course, this cantilever effect is further multiplied by any off center load placement. Considering that the truck body center floor support area anchors these cantilevered truck body floor side areas on either side of the truck body center floor area, it is clear that the truck body center floor area must be able to withstand considerable load stresses.

Moreover, in the dumping of an off-highway truck body, it is the truck body center floor, where the off-highway truck chassis hydraulic dump cylinders are anchored. As such the "body floor sweet spot" is subjected to combined loading stress, extreme hauling stress and dumping stresses.

Other factors considered in the design and production of large off-highway truck bodies include the size of materials used to produce the truck body. For instance, the maximum width of most steel plate (as limited by steel mill production capabilities) is ten (10) feet, although there are a limited number of steel mills which can produce steel plate twelve (12) feet or more in width. However, to obtain the very high quality, high strength steel utilized in truck bodies ten (10) foot wide steel plate is a common limit. To further complicate the steel plate issue, the common steel strength for steel plate used in off-highway truck bodies is one hundred seventy five thousand (175,000) to two hundred thousand (200,000) pounds per square inch (psi) yield strength. However, the typical highest strength weld materials that can be used to join steel plates of the strength used in a truck body is eighty thousand (80,000) to one hundred (100,000) pounds per square inch yield. With these disparities in strength between the steel plates and the welds used to join them, it is desirable to minimize and wherever possible eliminate weld "butt" joints, and wherever possible for body structural members to be joined by overlapping or intertwining so that the inherent strength of the basic steel being used can be fully achieved.

In the design of off-highway truck bodies another important consideration is the transport of an assembled off-highway truck body. In today's world, transport of large over width loads can, at best, be a challenge and can sometimes be impossible. In the Eastern half of the United States of America, shipping anything wider than sixteen (16) feet in some areas is impossible. Even in areas where it can be done, the cost to ship structures of this width can approach $100.00 per mile of load movement. In contrast, in the Western United States of America, movement of over-width off-highway truck bodies (those over twenty (20) feet in width) can be done for $10.00 to $15.00 per mile. In other parts of the world, shipping width constraints may be smaller or larger than sixteen (16) feet wide, but rarely are shipping widths of twenty seven (27) to thirty (30) feet wide allowed without severe restrictions. In some cases this may mean that truck body component work must be initiated at one point, and completed truck body components then shipped to a fabrication point near the actual location of use, and the truck body then assembled at or near the final point of use. The degree to which the truck body components are assembled or completed at an initial point is typically dictated by the actual shipping constraints of the final delivery point of use.

There are several available options for truck body fabrication and shipping. These include:
1. full assembly and completion of a truck body at the initial point of fabrication, in which, due to shipping constraints, the typical overall truck body width may be limited to sixteen (16) feet,
2. initial truck body component assembly at a first point of fabrication, followed by shipment of truck body components (in kit form) to an intermediate finish point of fabrication for final assembly, and subsequent delivery to final delivery location, and
3. complete truck body component assembly at the initial original point of fabrication, shipment of fully fabricated truck body assemblies to an intermediate finish point of assembly, and subsequent delivery to final delivery location.

Other options are available for fabricating and shipping truck bodies, but the above three options are the most common.

To use an analogy from nature, the loadings and load distribution on an off-highway truck body floor can be compared with that of a "tree". The trunk of a tree is like the center of an off-highway truck body, with the truck body floor supports extending outward off of the truck body center floor being much like the limbs of a tree. The roots of the tree are further analogous to the pivot connection point of the truck body to the off-highway truck chassis.

Today, in the off-highway truck operating arena it is commonly held that if a truck body floor lives a truck body lives. But, once an operator has to start working on and repairing a truck body floor, then that truck body floor and associated truck body components (body sides, body front wall, and body canopy) are close to the end of their useful life. Because of the high stresses that can and do occur in the area of the truck body to chassis pivot connection, when combined with the truck body floor "sweet spot" loading impacts, it is this area of the truck body to chassis interfaces, i.e., the truck body pivots, the truck body frame rails, and the truck hoist mounts that off-highway truck body floor failure normally begins.

In designing off-highway truck bodies, numerous factors should be taken into consideration, including:
1. the rocking and rolling stresses imparted on a truck body floor in the 'dynamic' operation of off-highway trucks that occurs when travelling over less than ideal ground or road support conditions,
2. the dumping of an off-highway truck body and the 'dynamic' stresses occurring in the area of the hydraulic dump cylinders and truck body floor attachment point as loaded truck bodies are raised and lowered,
3. the high cost of owning and operating an off-highway truck and the need to operate the off-highway truck and truck body at its maximum productive capabilities,
4. the need for off-highway truck fast 'loading point' turn around and loading-point bucket sizes that are 20 to 25% of an off-highway trucks carrying or hauling capacity,
5. the loading impacts (dependent on body application) on the body "sweet spot",
6. the off-highway truck chassis to truck body connection stresses in the truck body "sweet spot" area,
7. the actual application in which the off-highway truck will be used, and the intensity of load impacting that can be expected to occur,
8. the critical nature of the off-highway truck chassis to truck body interface in conjunction with the amount of truck body floor that is cantilevered outside the pivot points between the off-highway truck chassis and truck body,
9. the availability of large-width steel plates and the need to overlap and/or intertwine body components wherever possible in the joining of different steel members, and
10. truck body shipping constraints from the initial point of off-highway truck body manufacture to a potential point of final truck body assembly, and then delivery to the ultimate off-highway truck body user.

In considering all of the above truck body design criteria, it can be appreciated that the design and construction of the center of a truck body floor is crucial to the total success and longevity of large off-highway truck bodies. High structural loads can often occur in the off-highway truck body floor center chassis connection area. This area, in particular, of an off-highway truck body needs to be designed to withstand all the rigors that an off-highway truck body dump body pivot may be subjected to.

SUMMARY OF THE INVENTION

In an embodiment, the present invention provides a truck body floor including a truck body floor frame and a floor plate attached to and supported by the truck body floor frame. The truck body floor frame includes two frame rails extending along a longitudinal length of the truck body floor, and a plurality of latitudinal bolster structures attached to both of the two frame rails and extending across a width of the truck body floor. The plurality of latitudinal bolster structures includes at least one layered bolster structure having an inner bolster and an outer bolster, with the outer bolster at least partially flush with and attached to the inner bolster.

In another embodiment, the invention provides a method of providing a truck body floor that includes constructing a central truck body floor segment at a first location, where the central segment includes two frame rails extending in a longitudinal direction of the central truck body floor segment, a plurality of latitudinal bolster structure central segments, at least one of which includes an inner bolster and an outer bolster, and a central floor plate section supported by the frame rails and bolster structure central segments. The central truck body floor segment being sent to a second location for assembling the truck body floor components including (center floor [one piece] and side floor pieces [two]) at the second location.

BRIEF DESCRIPTION OF THE DRAWINGS

Exemplary embodiments of the present invention are described in more detail below, with reference to the drawings, in which:

FIG. 7B shows a bottom isometric view of the truck body floor of FIG. 7A;

DETAILED DESCRIPTION

Figure 1:
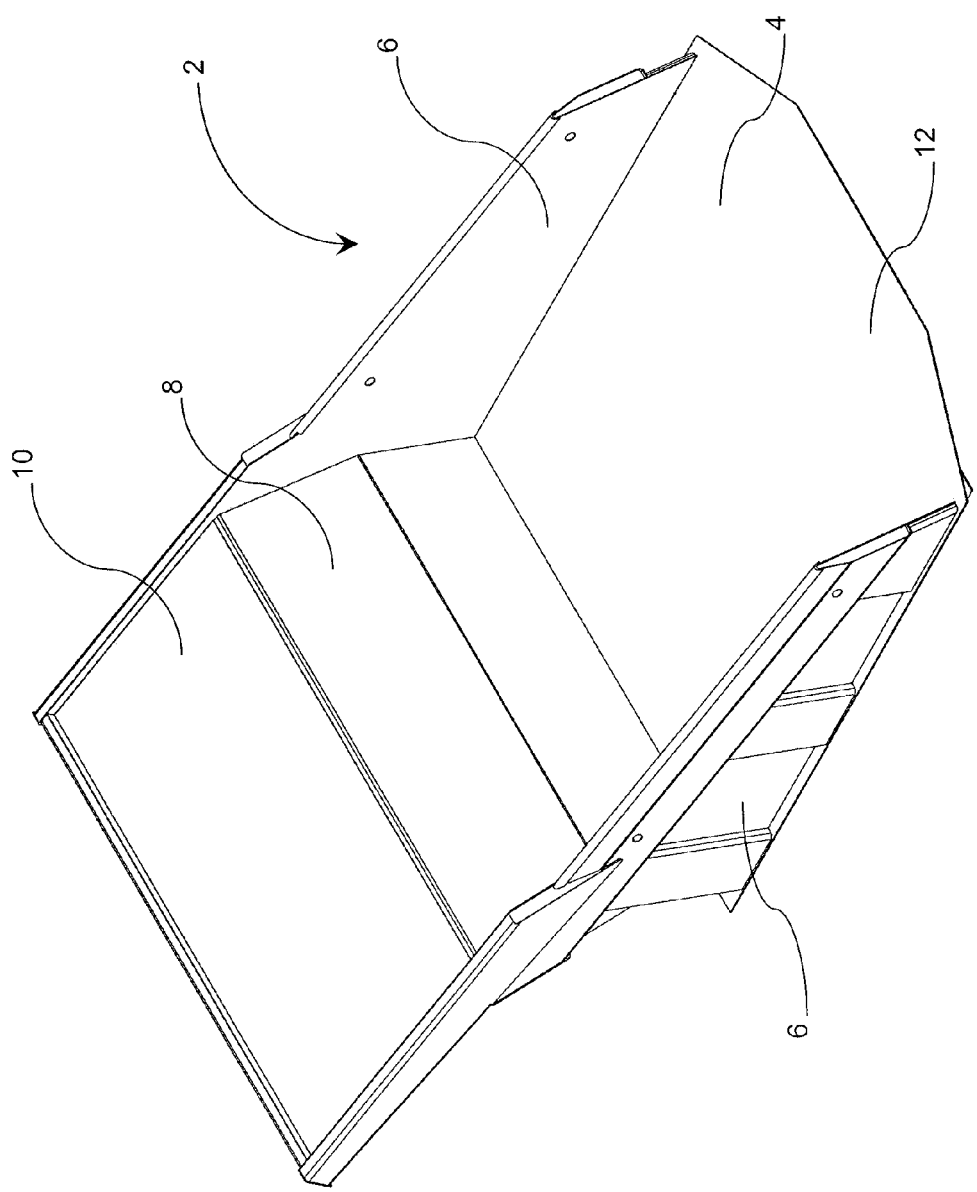
FIG. 1 shows a top isometric view of a truck body for an off-highway truck.

FIG. 1 shows a truck body 2 for an off-highway truck. The truck body 2 includes a truck body floor 4, two side walls 6 and a front wall 8. A canopy 10 extends forward from the top of the front wall 8 in order to cover the front of a corresponding truck chassis, and particularly the operator's cab of the off-highway truck. In FIG. 1, only the upper surface, of floor plate 12 of the truck body floor 4 is visible. In contrast, in FIG. 2 the frame 14 of the truck body floor 2 is partially visible through the cutout provided in the floor plate 12, and in FIG. 3 the truck body floor frame 14 can be seen in its entirety from below.

The truck body floor frame 14 includes two frame rails 16 running along the length of the truck body 2, where the length extends from the front wall 8 and canopy 10 to a rear edge 18 of the truck body floor 4. The frame rails 16 are positioned toward the center of the truck body 2, with respect to the truck body width and run substantially parallel to each other. The truck body floor frame 14 also includes a series of bolster structures 20 extending across the width of the truck body floor, where the width extends from one side wall 6 of the truck body 2 to the other. Together, the frame rails 16 and bolster structures 20 support the floor plate 12. In the illustrated embodiment, the floor plate 12 is supported directly by both the bolster structures 20 and the frame rails 16. The bolster structures 20 are held within appropriately sized openings within the frame rails 16, so that a strong connection between these elements is formed, and so that the top of the bolster structures 20 and frame rails 16 can both be flush with and support the floor plate 12. The two substantially parallel frame rails 16 also include pivot 36, where the truck body 2 is connected to the off-highway truck chassis. The pivot 36 acts as a hinge point for the truck body when the truck body is pivoted to dump the loads held inside the truck body.

Figure 4A:
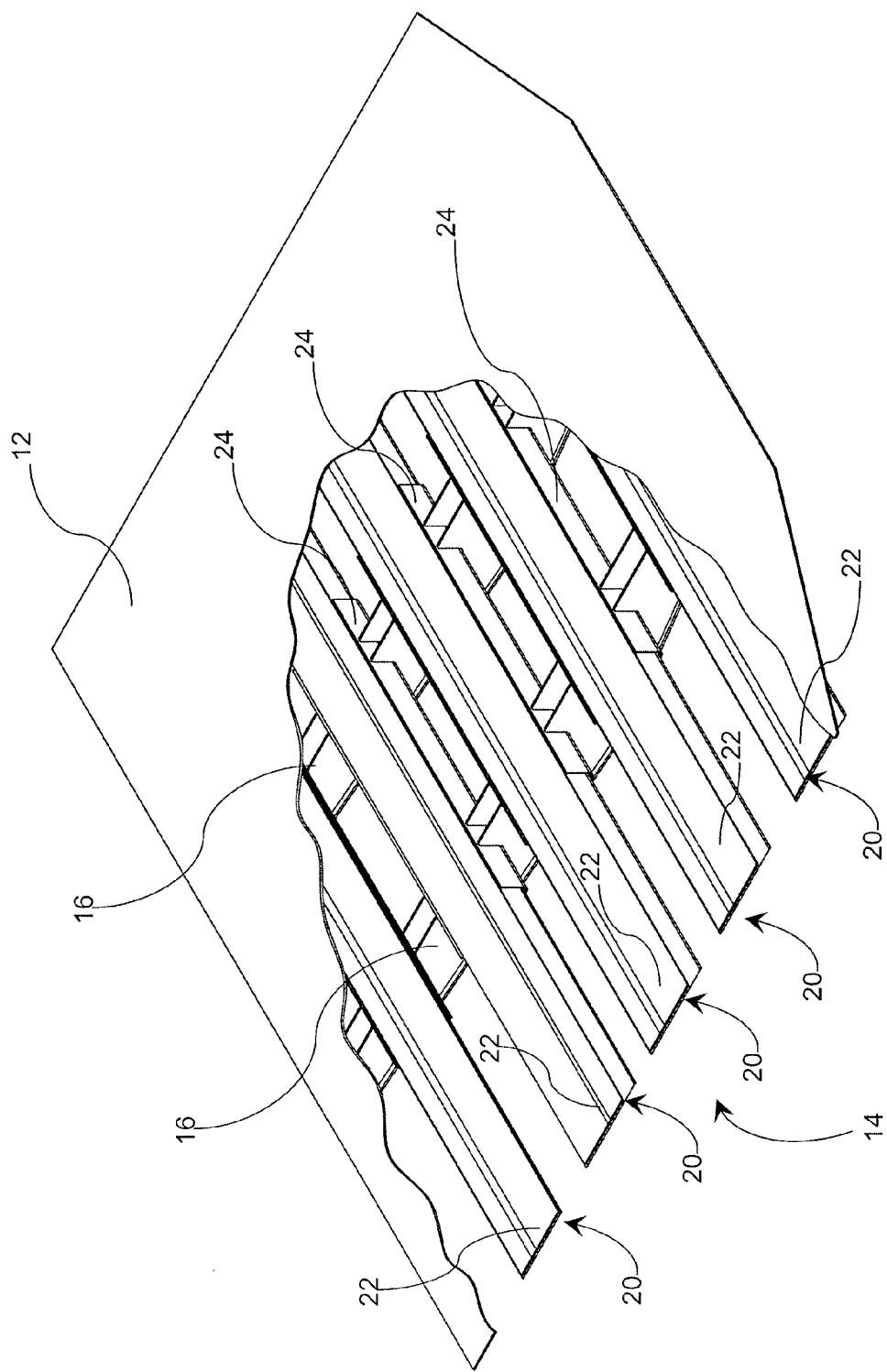
FIG. 4A shows a top isometric view of a truck body floor with a one-piece construction.
Figure 4B:
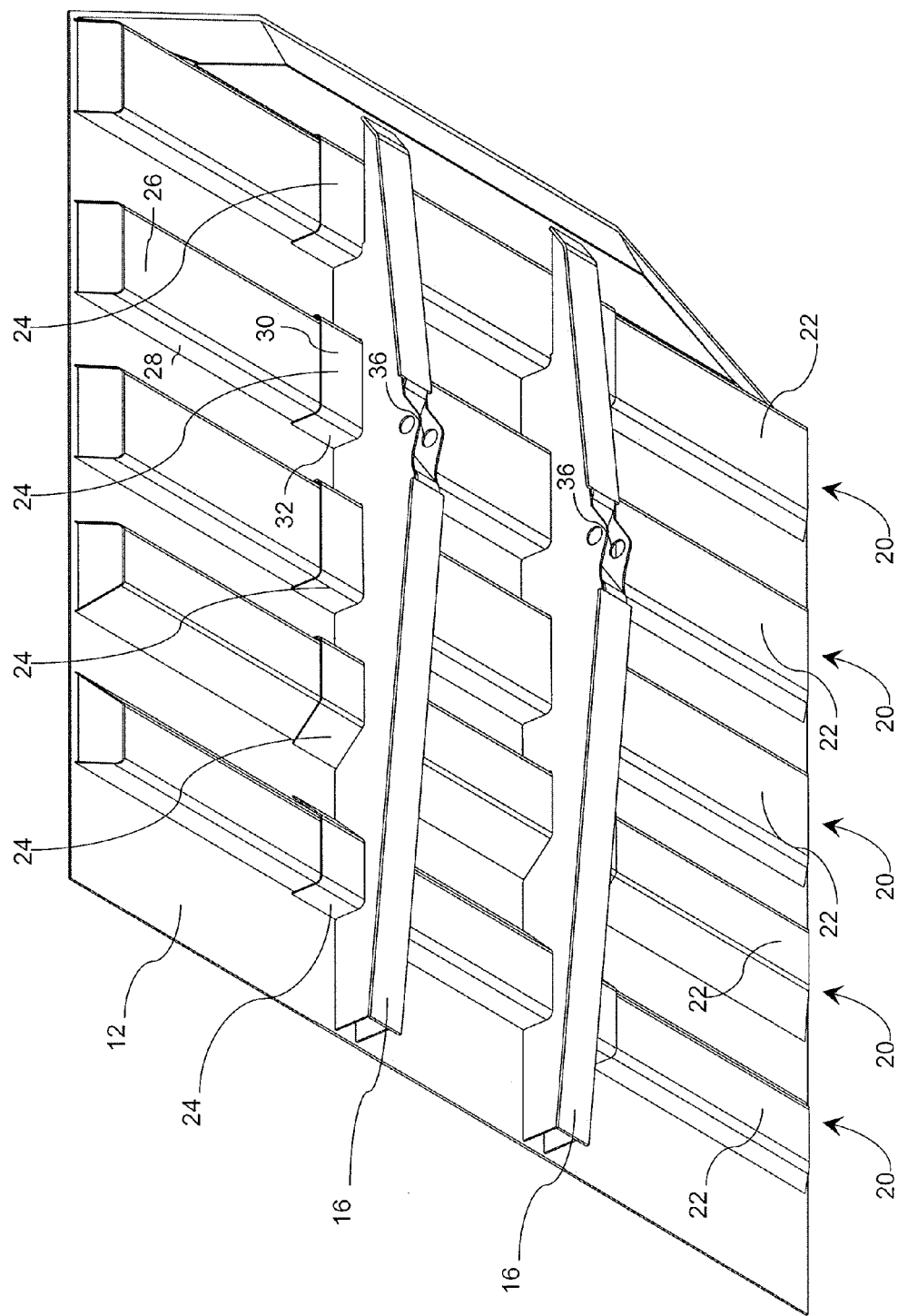
FIG. 4B shows a bottom isometric view of the truck body floor of FIG. 4A.

As shown in FIGS. 4A and 4B, which show the truck body floor 4 alone, each of the bolster structures 20 has a layered or doubler construction including an inner bolster 22 and an outer bolster 24, which are coupled to one another with respective faces of the inner bolster 22 being flush against opposing faces of the outer bolster 24. Specifically, in the illustrated embodiment, the inner bolsters 22 are formed as a channel that is layered within the outer bolster 24, which is formed as a similar but larger channel and interlocked with the smaller channel. Thus, as shown in FIG. 4B, the inner bolster 22 includes a web 26 and opposing flanges 28 that are placed flush against a corresponding web 30 and flanges 32 of a respective outer bolster 24. Thus, the outer bolster 24 forms a layer of the bolster structure 20 over a portion of the inner bolster 22. In an embodiment, the inner and outer bolsters 22, 24 are welded together, although other forms of connecting the corresponding faces of the bolsters is also possible. By using both inner 22 and outer bolsters 24, the layered or doubler bolster is effectively doubled wherever both bolsters 22, 24 are present. Preferably, the outer bolsters 24 are shorter than the inner bolsters 22 and disposed at the center of the length of the inner bolsters 22, as shown in FIGS. 4A and 4B. As a result, the bolster structure 20 has a thickness that is larger at the center of the truck body floor than at the sides of the truck body floor. This concentrates the layered doubler portion of the bolster structures 20 in the center of the truck body 2, around the connection points with the off-highway truck chassis, where the loads and associated stresses are concentrated. The bolster structures 20, which include inner 22 and outer bolsters 24, are able to compensate for the extreme cantilever side floor loads that a truck body floor is exposed to because of the doubling of the layered center bolster structural support provided immediately under the center of a truck body floor.

While the illustrated embodiment shows each of the bolster structures 20 as including the layered bolster configuration, with both an inner bolster 22 and an outer bolster 24, it is also possible for some of the bolster structures 20 along the length of the truck body floor 4 to be formed by a single bolster component. For example, if only some of the bolster structures 20 included the layered doubler bolster structure, these doubled bolster structures could be concentrated near the pivot 36 of the truck body disposed on the body frame rails 16. In a specific example, the truck body floor frame 14 may only include the doubled bolster structures, each including an inner bolster 22 and outer bolster 24, on either side of the pivot 36. The load capacity of the bolster structures 20 could likewise be concentrated in certain locations by varying the length of the outer bolster 24. For example, the outer bolsters 24 could be longer near the pivot 36, or could increase in length from the front of the truck body floor toward the rear. For stronger support of loads in the truck body, it is preferable that the length of the outer bolsters 24 be longer than the distance between the two frame rails 16, so that each outer bolster 24 can be supported by both frame rails 16. On the other hand, it is typically not necessary that the outer bolsters 24 extend far toward the side walls 6 of the truck body. For example, the outer bolsters 24 may in some cases be less than half of the width of the truck body 2 and accordingly, also in some cases be less than half the width of the inner bolsters 22.

Figure 2:
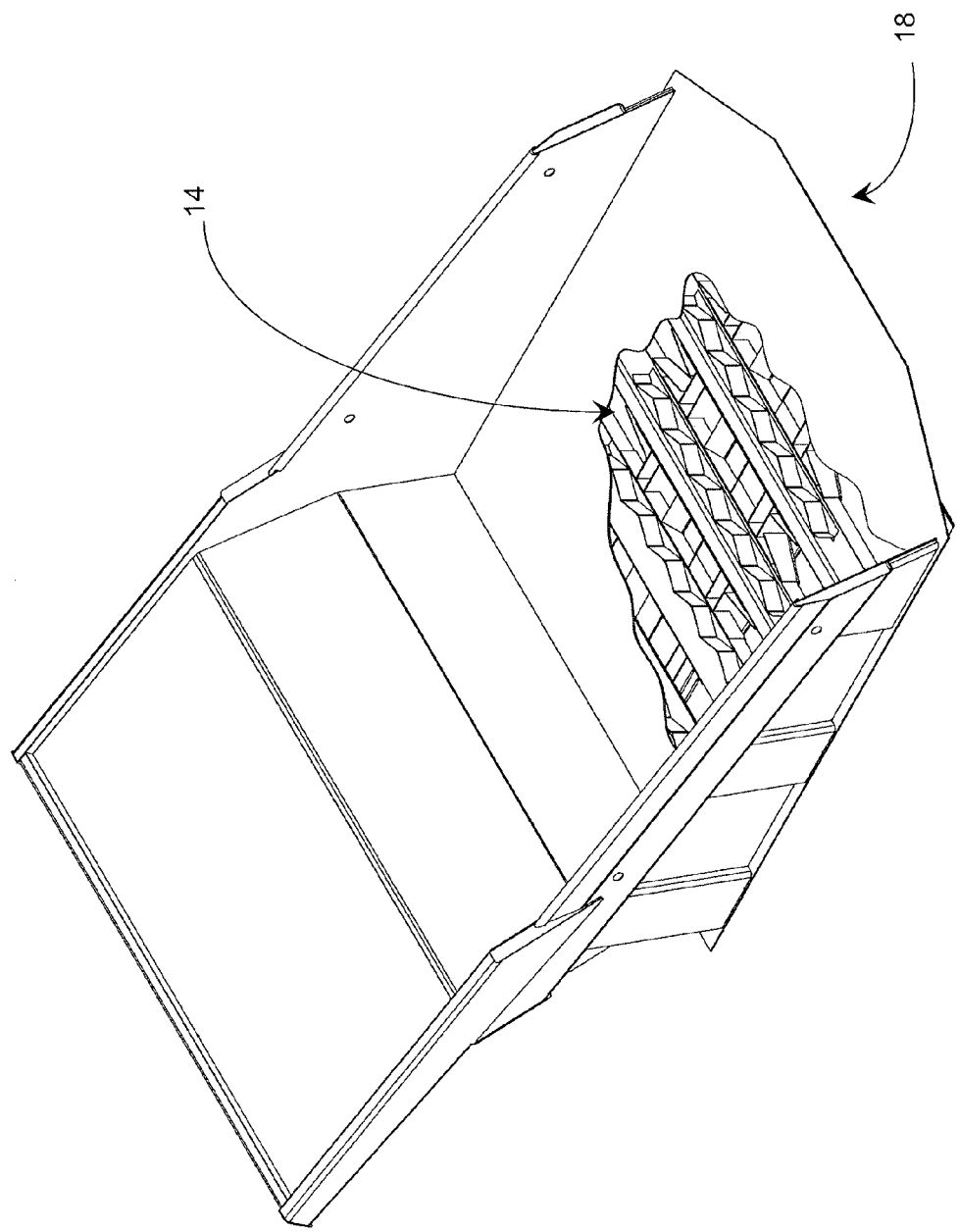
FIG. 2 shows a top isometric view of an embodiment of a truck body in accordance with the present invention having a one-piece floor construction.
Figure 3:
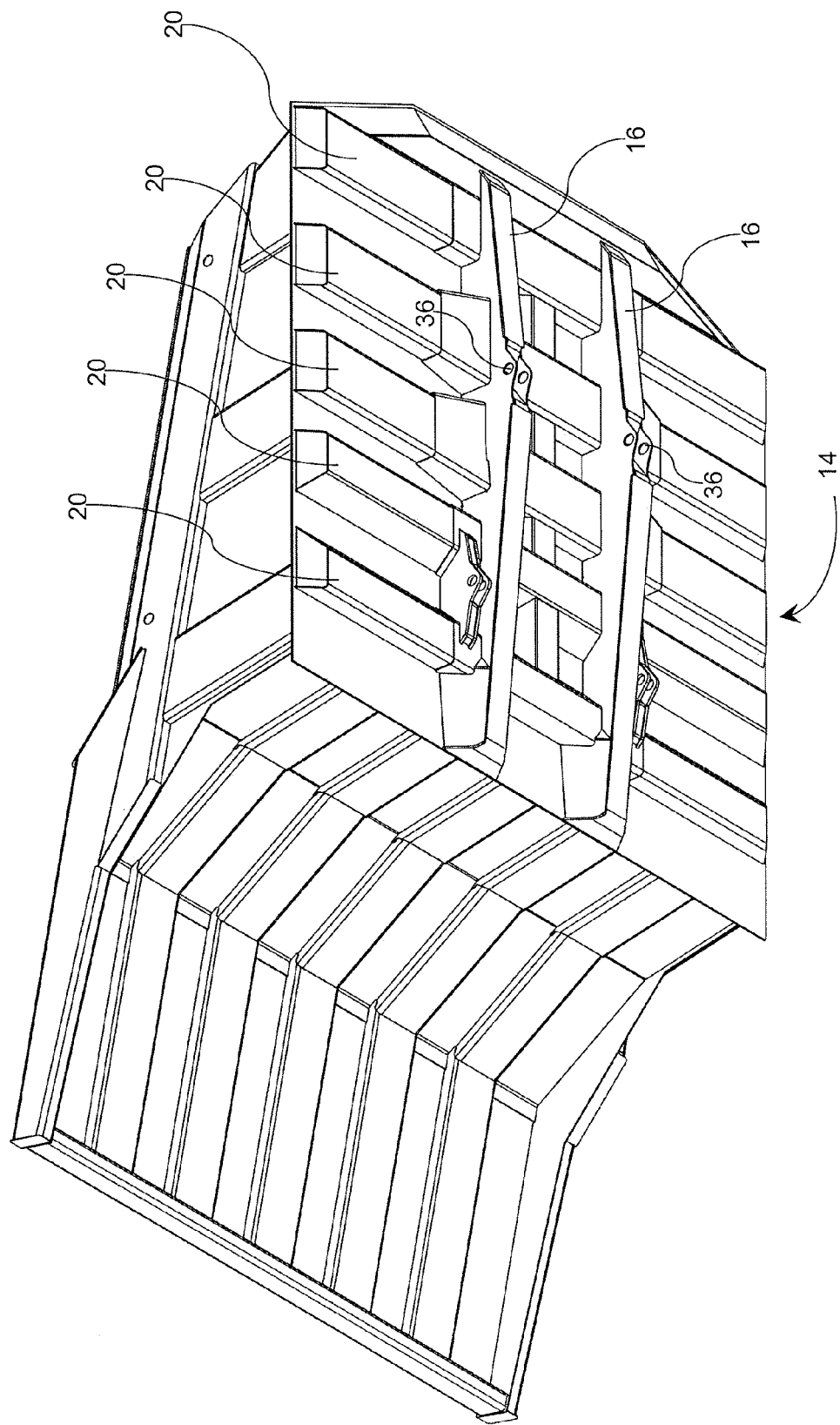
FIG. 3 shows a bottom isometric view of the truck body shown in FIG. 2.
Figure 4C:
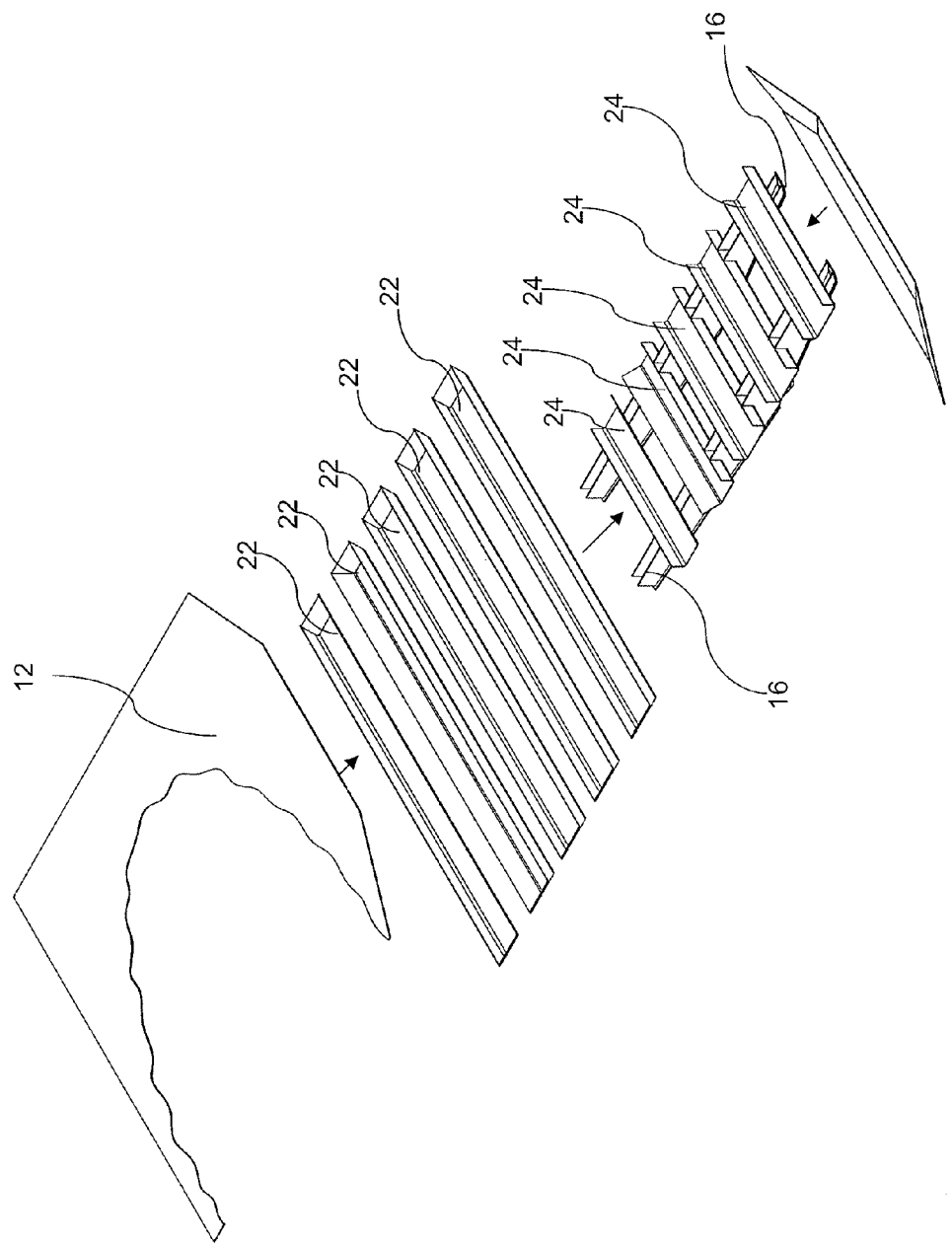
FIG. 4C shows an exploded view of the truck body floor of FIG. 4A.

In the embodiment shown in FIGS. 2-4, the bolster structures 20 include the outer bolster 24 at the center of structure 20 and the inner bolster 22 extending along the entire length of the bolster structure so as to correspond to the entire width of the truck body. While truck bodies having bolster structures 20 with this construction are perfectly adequate functionally, their use can be limited due to shipping constraints. As explained above, if the truck body width is large, the shipping of the truck body, or even just the truck body floor, in a single piece may be against regulations. Thus, the embodiment shown in FIGS. 2-4, including bolster structures 20 with members 22 extending across the entire width of the truck body 2, may be most appropriate where the width of the truck body is less than a certain size, or where the truck body will be assembled nearby or on site.

Figure 5:
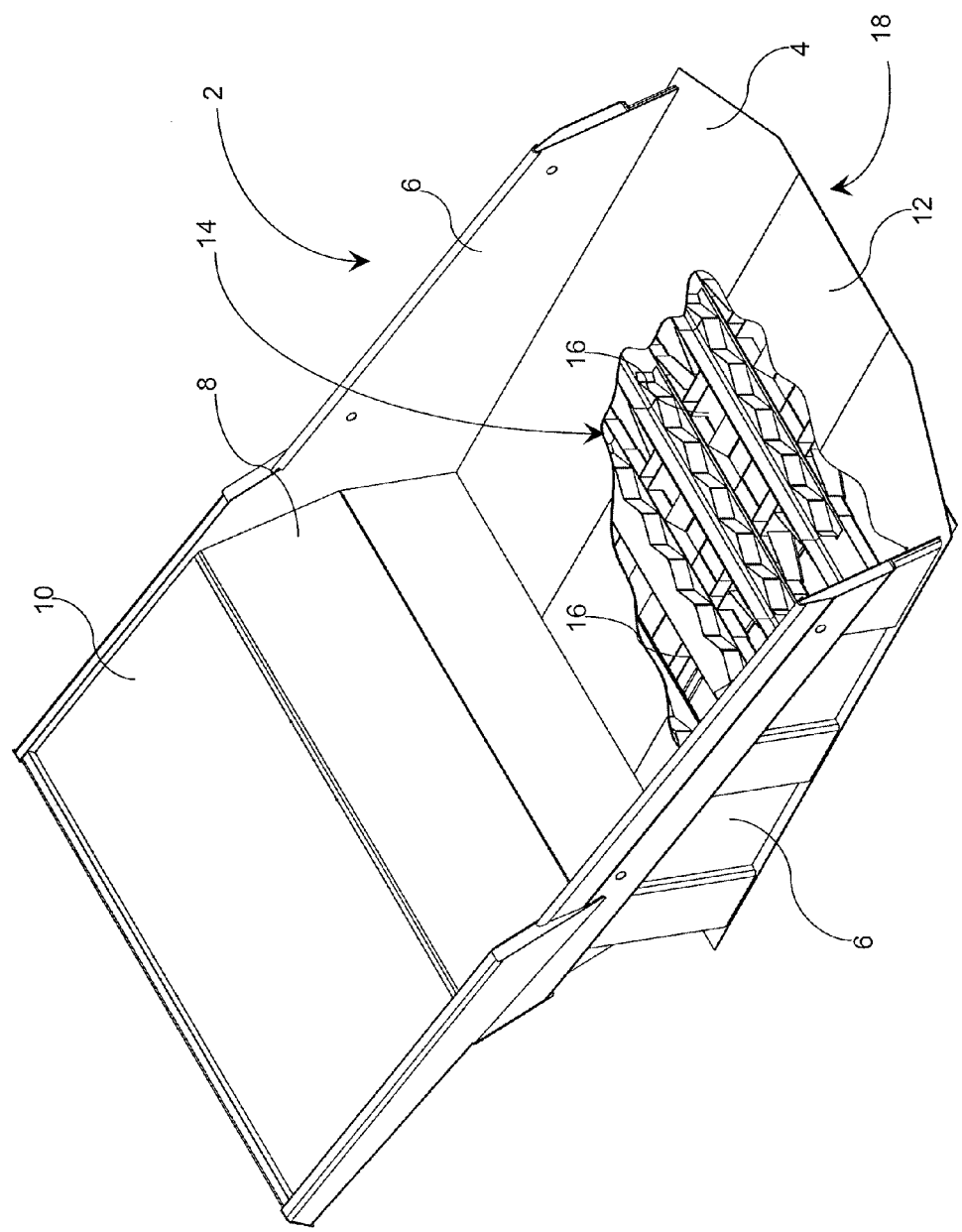
FIG. 5 shows a top isometric view of an embodiment of a truck body in accordance with the present invention having a multi-piece floor construction.
Figure 6:
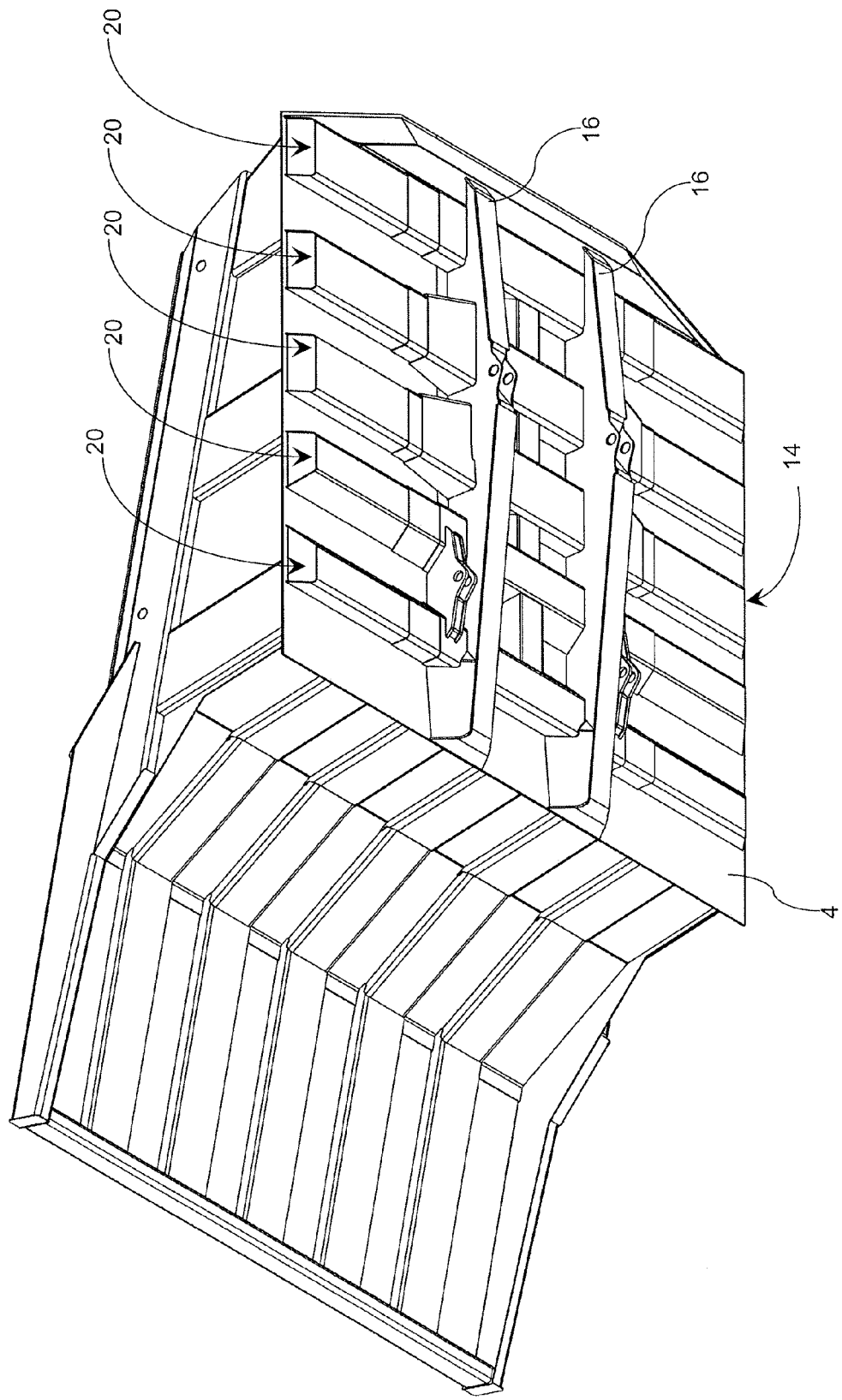
FIG. 6 shows a bottom isometric view of the truck body shown in FIG. 5 having a multi-piece floor construction.
Figure 7A:
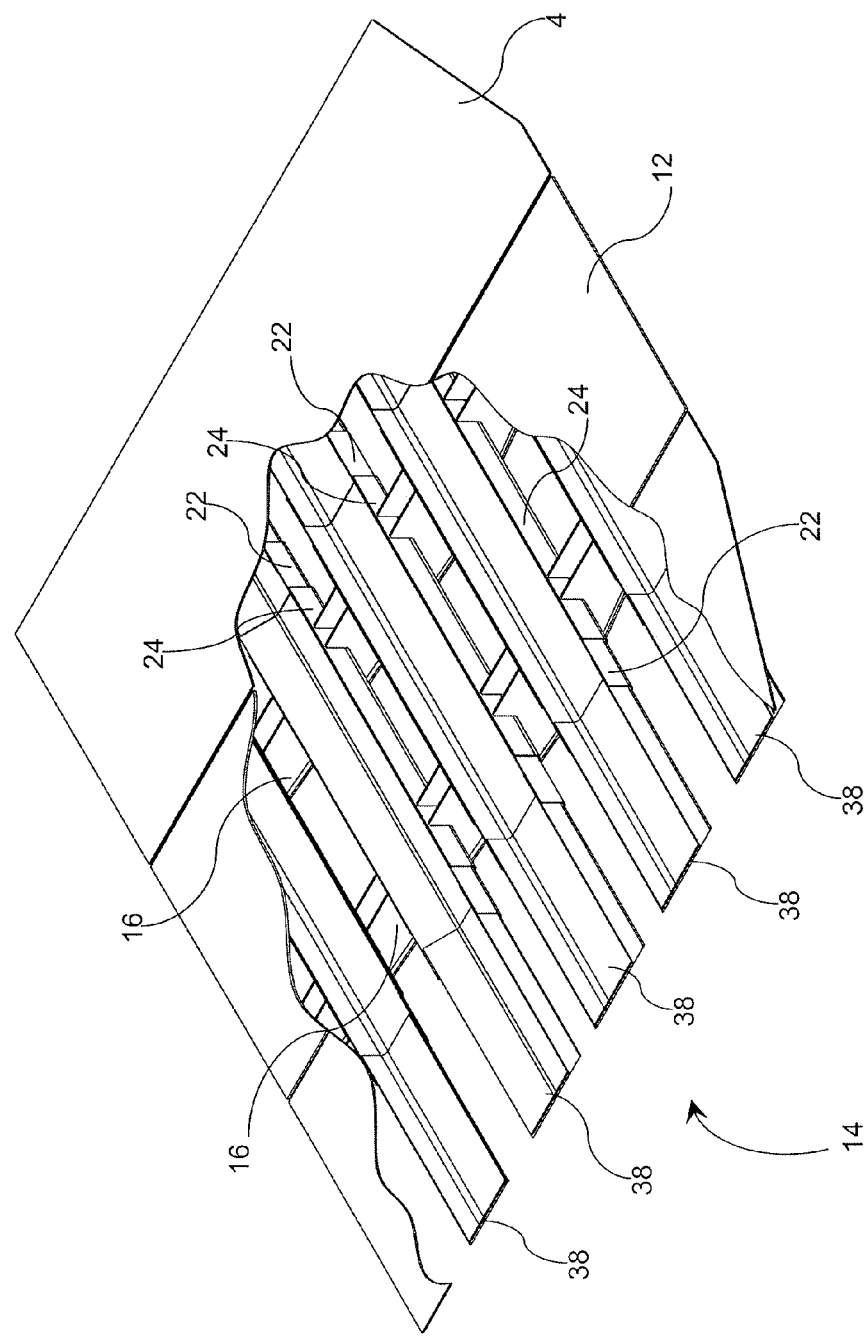
FIG. 7A shows a top isometric view of a truck body floor with a three-piece construction/having a multi-piece floor construction.

In instances where a large truck body is required and assembly on site is not practical, it may be advantageous to use an embodiment of the truck body shown in FIGS. 5 and 6. Similar to the embodiment shown in FIGS. 2 and 3, the truck body of FIGS. 5 and 6 includes a body floor 4, two side walls 6, a front wall 8 and a canopy 10. Likewise, the body floor 4, shown alone in FIGS. 7A and 7B, includes a frame 14 with a pair of body frame rails 16 and a plurality of bolster structures 20 extending along a length of the body frame rails. Further, the bolster structures are doubled toward the center of the width of the truck body floor 4, with an inner bolster 22 and an outer bolster 24. However, in contrast to the embodiment shown in FIGS. 2-4, the inner bolsters 22 of the truck body floor of FIGS. 7A and 7B do not extend across the entire width of the truck body. Instead, the ends of the bolster structures 20 as shown in FIG. 7B, at the outer sides of the truck body width, are formed by outside interlocking bolsters 38. Thus, each of the bolster structures 20 include an outside interlocking bolster 38 disposed at each end to support the loads toward the outer sides of the truck body. In the illustrated embodiment, these outside interlocking bolsters 38, are formed as channels, similar to the inner and outer bolsters 22, 24. Thus the outside interlocking bolsters 38 can fit inside or outside (inside shown) the inner bolsters 22 for attachment thereto. For example, the outside interlocking bolsters 38 can have an inner end portion that is set inside the inner bolster 22 so as to overlap with inner bolster 22. This overlapped section of the inner bolster 22 and interlocking outside bolster 38 can then be welded together for a secure connection between the outside interlocking bolsters 38 and doubled central bolsters. The overlap may be, for example, between six (6) to twenty four (24) inches.

Figure 7C:
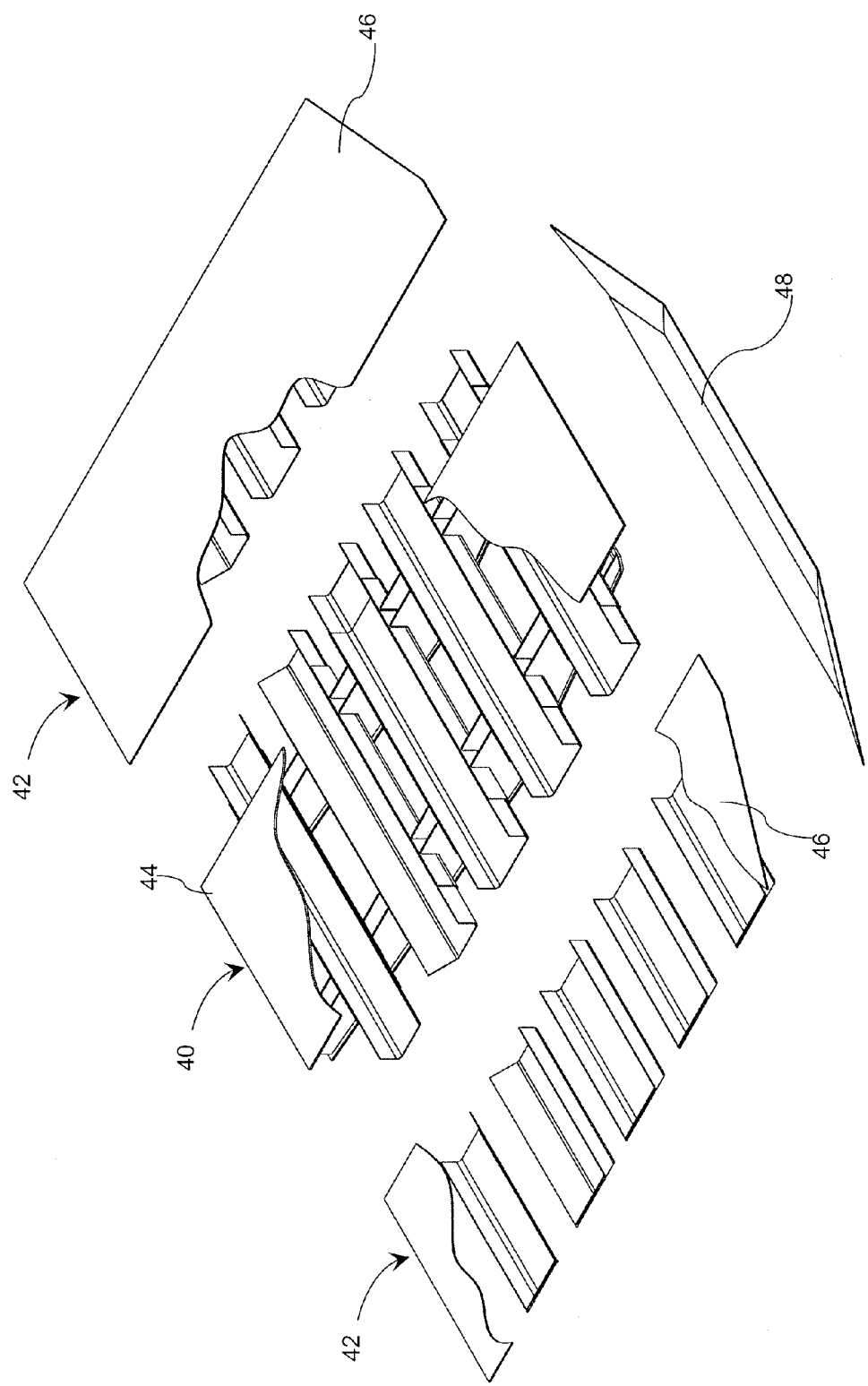
FIG. 7C shows an exploded view of the truck body floor of FIG. 7A.
Figure 7D:
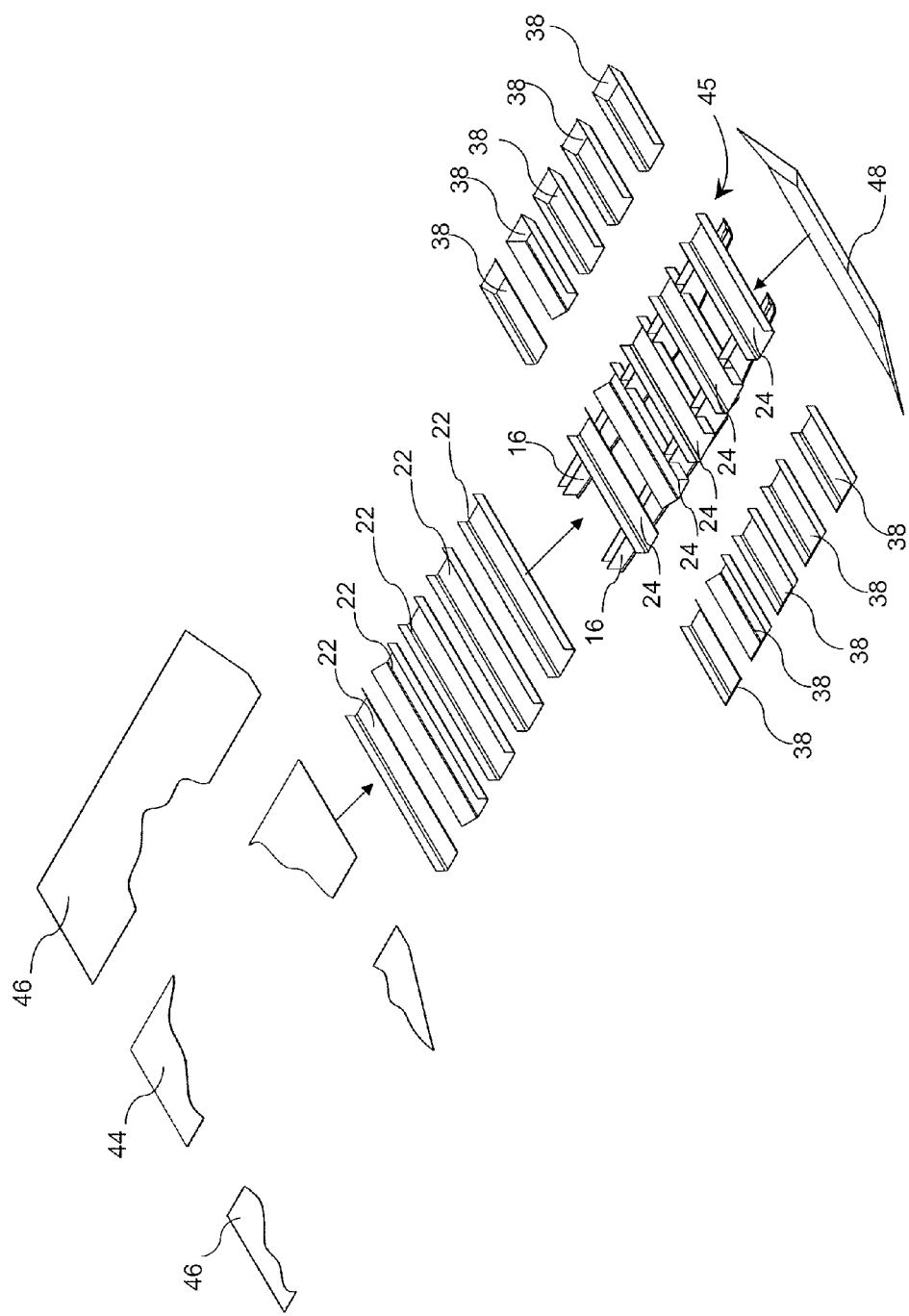
FIG. 7D illustrates the construction of the truck body floor of FIG. 7A.

The embodiment shown in FIGS. 5-7 has the advantage that it can be partially assembled into assembly pieces that are within any potential shipping constraints. For example, as shown in FIG. 7C, the truck body floor can be assembled in three pieces, including a central truck body floor segment 40 and two outside truck body floor segments 42. An exploded view of these components 40 and 42 is shown in FIG. 7C and assembly of such is further illustrated by FIG. 7D. To fabricate the central truck body floor segment 40, the frame rails 16 can be connected with central segments 45 of the bolster structures 20, including the layered inner bolster 22 and outer bolster 24. In addition, the central truck floor body segment 40 can also be outfitted with a central floor plate section 44, which may be composed of one or more steel plates. Likewise, the outside truck body floor segments 42 can be assembled by attaching each of the interlocking outside bolsters 38 to an appropriate outside floor plate section 46 for the right or left side of the body floor.

The assembly of the central truck body floor segment 40 and outside truck body floor segments 42, allows for a partial assembly of components that are not subject to shipping constraints, followed by a final assembly of the truck body floor at a new location. For example, the central truck body floor segment 40 and outside truck body floor segments 42 can be fabricated in a first location. These three segments 40, 42 can then be shipped to a second location, where the outside segments 42 are attached to the central segment 40. This can be accomplished by inserting the outside bolsters 38 within the inner bolsters 22 until the central floor plate section 44 meets outside floor plate sections 46. The floor plate sections 44, 46 and bolster components 22, 38 can then be assembled to one another at the second location. Alternatively, the central truck body floor segment 40 could be assembled in a first location, and then shipped along with components of the outside segments 42, which could be added to the central truck body floor segment 40 at the second location.

Any of the additional features described below and shown in FIGS. 8-13 can also be included in the construction of a body floor 4 as shown in FIGS. 3 and 4 or the central floor body segment 40 and outside body floor segments 42 as shown in FIGS. 4 and 5.

FIGS. 8-14 show various additional features that can be included in embodiments of the present invention. Each of the features illustrated in these drawings can be used in combination with any of the other illustrated features. Moreover, while the embodiments shown in FIGS. 8-14 includes the interlocking outside bolsters, each of these features can also be used with a truck body floor having bolster structures including an inner bolster 22 that stretches across the entire width of the truck body, in a one-piece floor constructions, such as in FIGS. 2-4.

Figure 8:
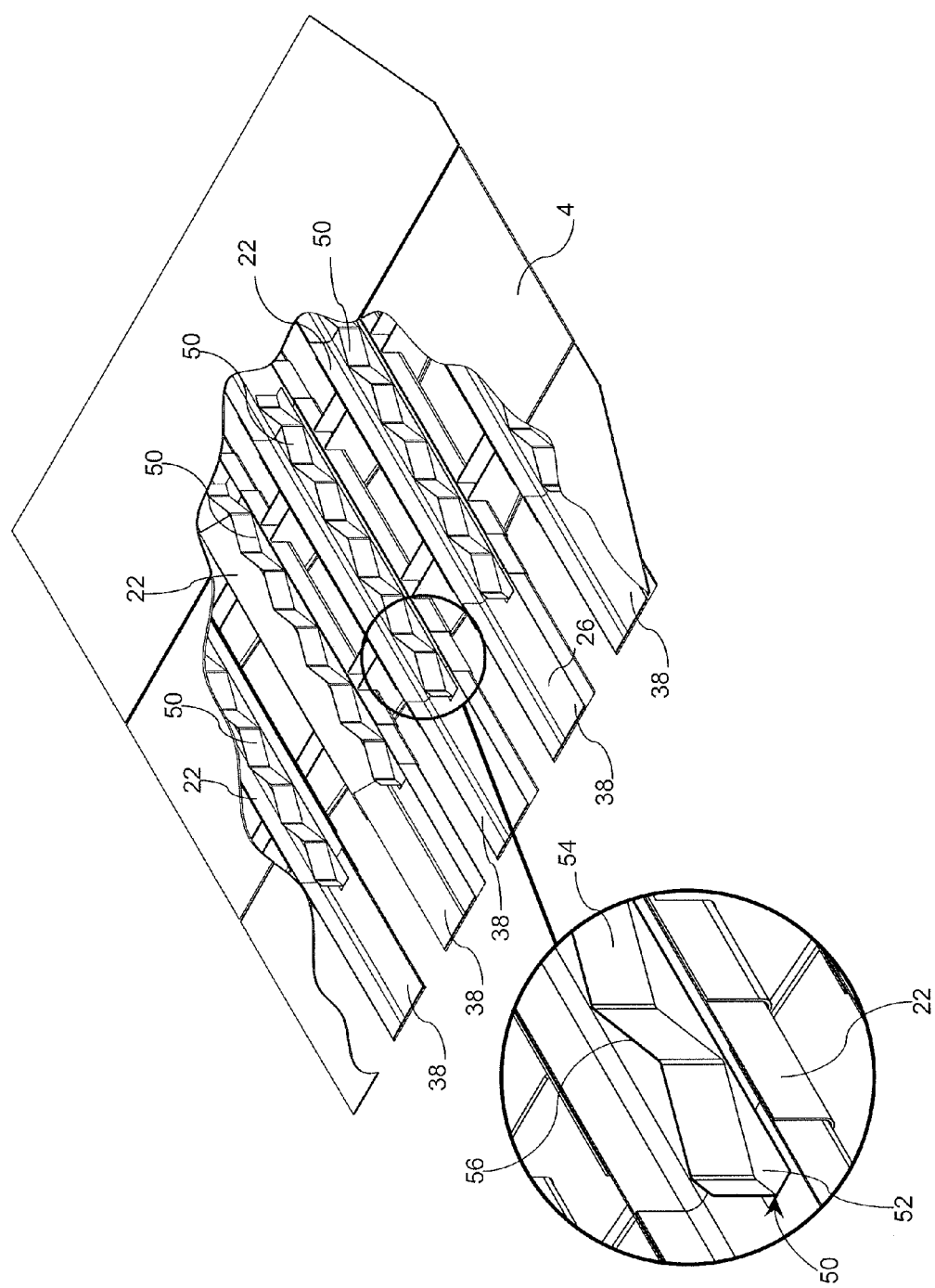
FIG. 8 shows a top isometric view and detail of a truck body floor having super stiffeners.

FIG. 8 shows an embodiment of a truck body floor 4 including super stiffeners 50 disposed within the channel formed by the bolster structure 20. The super stiffeners 50 include an elongate flat plate 52 that attaches to the web 26 of the inner bolster 22 and a scalloped stiffener plate 54 extending up from the flat plate 52. The scalloped stiffener plate 54 extends along the longitudinal length of the flat plate 52, curving back and forth from one edge of the flat plate 52 to the opposite edge. A top end 56 of the scalloped stiffener plate 54 attaches to the underside of the truck body floor plate 12. Preferably, the super stiffeners 50 are disposed centrally along the length of the respective bolster structure 20 so as to be centered with respect to the truck body width. As illustrated, in embodiment FIG. 8 that use interlocking outside bolsters 38, the length of the super stiffeners 50 can be longer than inner bolster 22 so as to extend into interlocking bolsters 38. Of course, it is also possible for the length of the super stiffeners 50 to be shorter than inner bolsters 22, or varied in length from one bolster structure 20 to another. Likewise, it is also possible that the super stiffeners 50 be used in certain bolster structures 20 and left out of other bolster structures 20 within the same truck body.

Figure 9A:
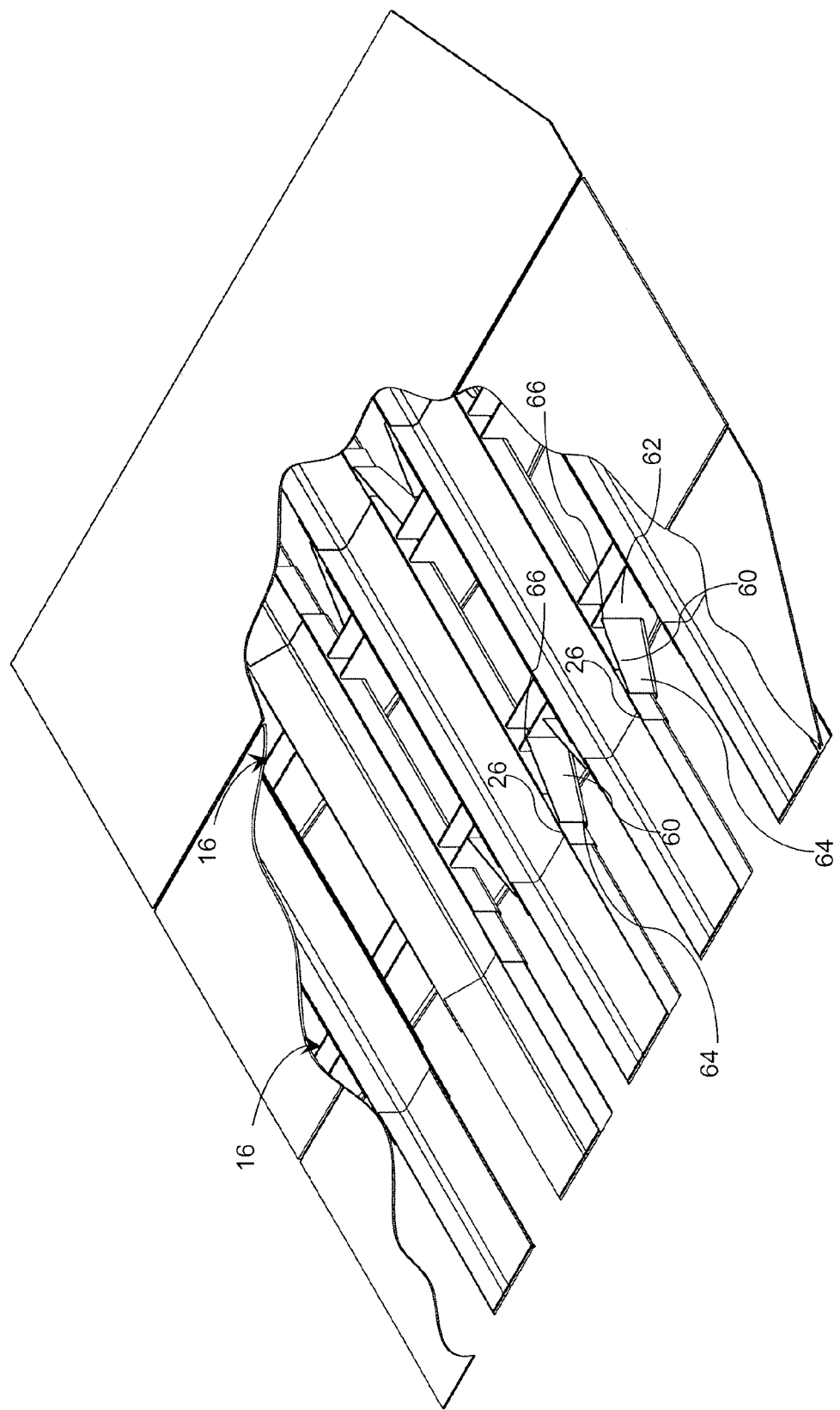
FIG. 9A shows a top isometric view of a truck body floor having half funnels.
Figure 9B:
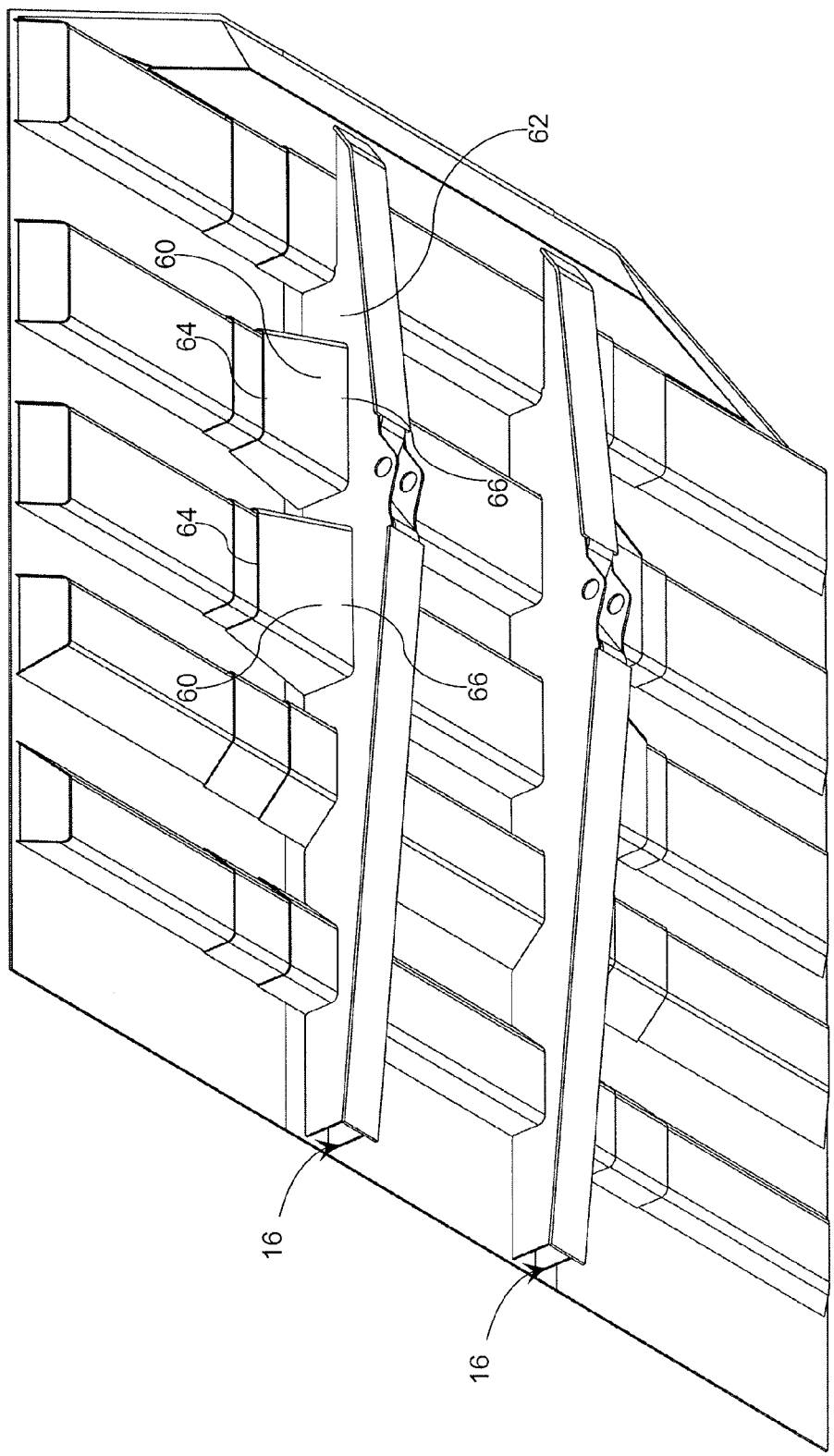
FIG. 9B shows a bottom isometric view of the truck body floor of FIG. 9A having half funnels.

FIGS. 9A and 9B show another embodiment of at truck body floor 4 that includes half funnels 60, each extending from a side surface 62 of the frame rails 16 to the bolster structure 22. As a result, the half funnels help distribute loading between the frame rails 16 and bolster structure 22. The half funnels 60 have the shape of a tapering channel that taper outward from a narrow end 64 that fits tightly over a section of the bolster structure 22 to a wide end 66 that is disposed flush against the side surface 62 of a corresponding frame rail 16. The half funnels 60 shown in FIGS. 9A and 9B are disposed outside of the two frame rails 16. However, it is also possible to include half funnels 60 between the frame rails 16, so that such a half funnel is disposed against an inside surface of the respective frame rail. While the half funnels 60 are illustrated as extending from the frame rails 16 to the inner bolster 22, it is also possible for the half funnel 60 to extend to the outer bolster 24, particularly if the outer bolster is longer than shown in FIGS. 9A and 9B, or to extend to the interlocking outside bolster 38.

In another embodiment, the half funnels 60 can be used in combination with the super stiffeners 50 shown in FIG. 8. Such a combination is shown, along with additional features, for a truck body having a one piece floor construction in FIGS. 2 and 3, and for a truck body having a three piece floor construction in FIGS. 5 and 6.

Figure 10A:
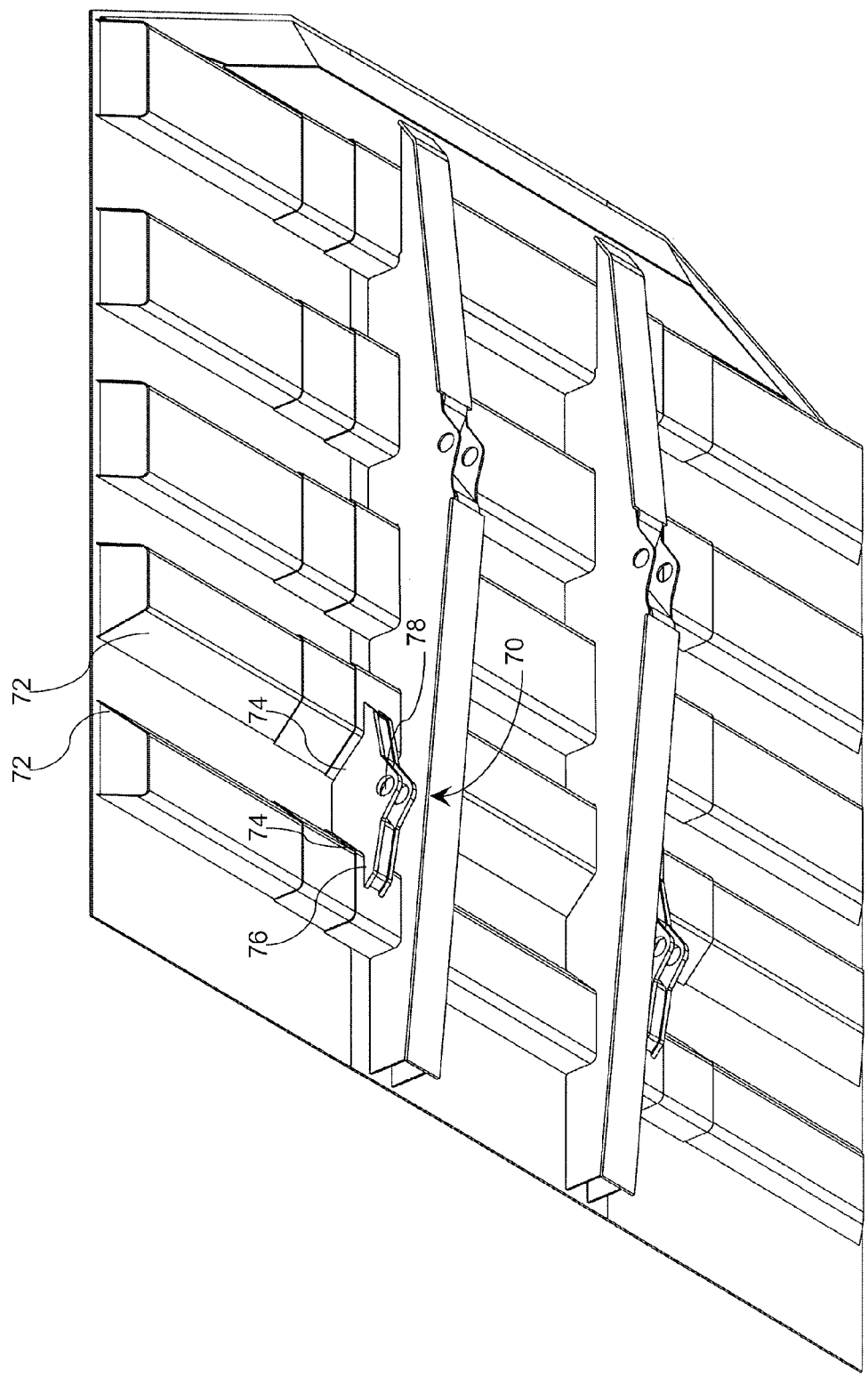
FIG. 10A shows a bottom isometric view of a truck body floor including tapered hoist joints.
Figure 10B:
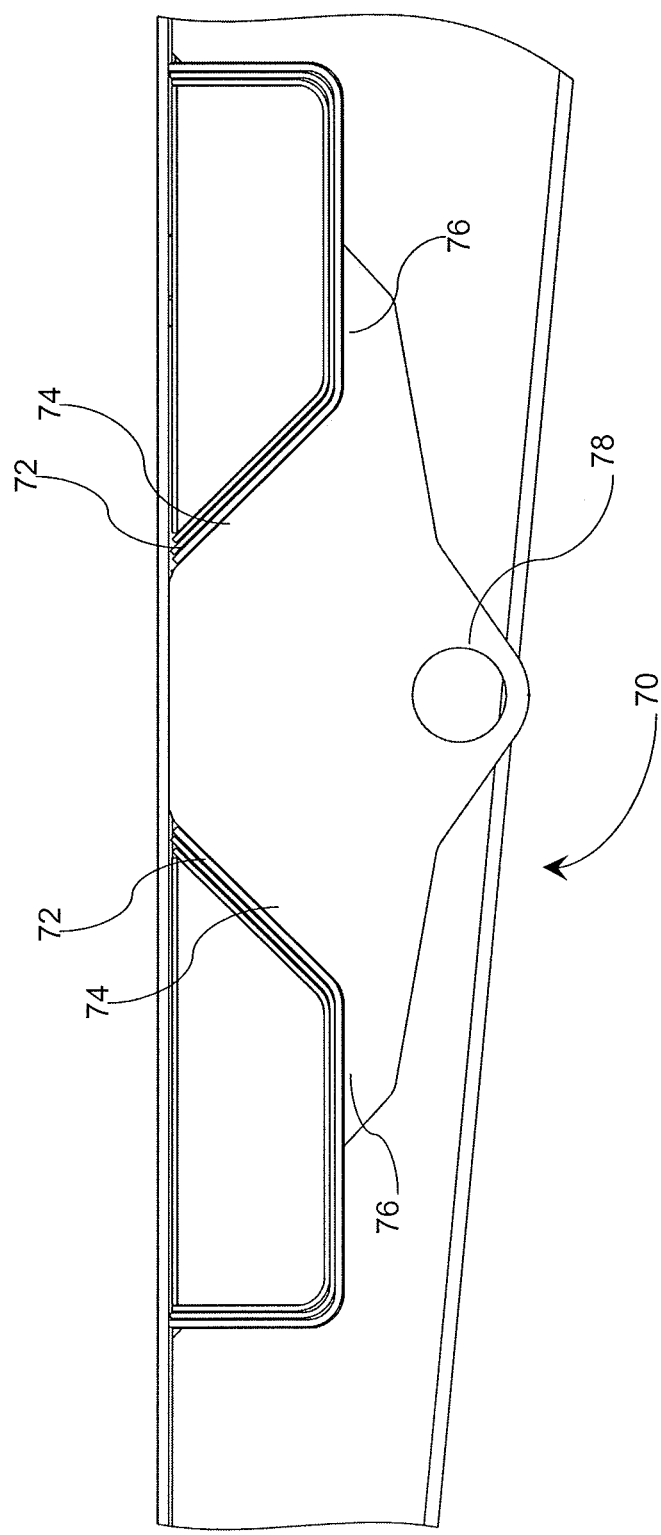
FIG. 10B shows a detail view of a portion of the truck body floor of FIG. 10A including tapered hoist joints.

FIGS. 10A and 10B show another embodiment of a truck body floor 4 including tapered hoist mounts 70. To utilize the tapered hoist mounts 70, two of the bolster structures 20 include tapered flanges 72 that taper toward one another as they extend toward the floor plate 12. Thus, the tapered flanges 72 are each disposed at an angle that is not perpendicular to the corresponding web. The tapered hoist mounts 70 include corresponding tapered supports 74 that abut the tapered flanges 72 to attach to the corresponding bolsters 20. In addition, an extension 76 of the hoist mounts 70 may also extend outward past the flanges 72 to attach to the lower web of the bolsters 20 directly. The tapered construction of the hoist mount 70 and bolsters 20, provides added support to the hoist mounts 70 against the bolsters 20 in comparison to a connection between a hoist mount and a vertical bolster flange, since that construction requires the hoist mount to bolster connection itself to provide support to the hoist mounts. With the construction shown in FIGS. 10A and 10B, the hoist mount 70 securely transfers loads from the hoist connection 78, where the hoist cylinders are mounted to the bolster structures 20 of the truck body floor 4.

In another embodiment, the tapered hoist mounts 70 can be used in combination with the super stiffeners shown in FIG. 8, with the half funnels shown in FIGS. 9A and 9B, or with both of these features. A combination including all three features, along with additional features, is shown for a truck body having a one piece floor construction in FIGS. 2 and 3, and for a truck body having a three piece floor construction in FIGS. 5 and 6.

Figure 11:
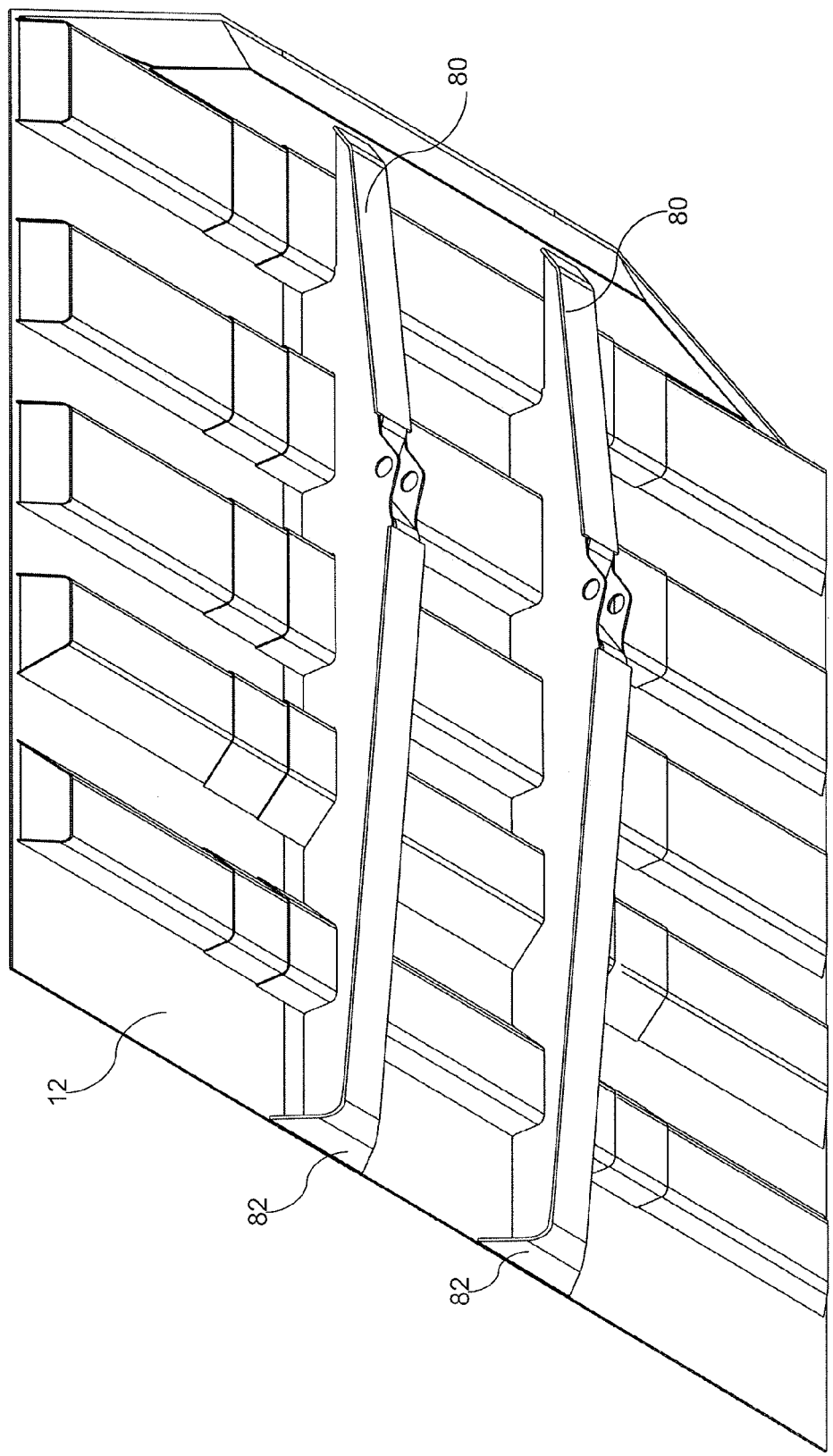
FIG. 11 shows a bottom isometric view of a truck body floor with a tapered front frame rail plate.

FIG. 11 shows another embodiment of a truck body floor 4 including tapered frame rail plates at the front of the truck body floor. As illustrated in FIG. 11, each of the frame rails 16 includes a frame rail plate 80 that runs along the lower portion of the frame rail 16 for substantially the entire length of the frame rail 16. At the front end of the frame rail 16, the frame rail plate 80 includes a tapered section 82 that tapers outward as the frame rail plate 80 extends upward to join the truck body floor plate 12.

In another embodiment, the tapered frame rail plates 80 can be used in combination with the super stiffeners 50 shown in FIG. 8, with the half funnels 60 shown in FIGS. 9A and 9B, with the hoist mounts 70 shown in FIGS. 10A and 10B, or any combination thereof. A combination including all four of these features, along with additional features, is shown for a truck body having a one piece floor construction in FIGS. 2 and 3, and for a truck body having a three piece floor construction in FIGS. 5 and 6.

Figure 12:
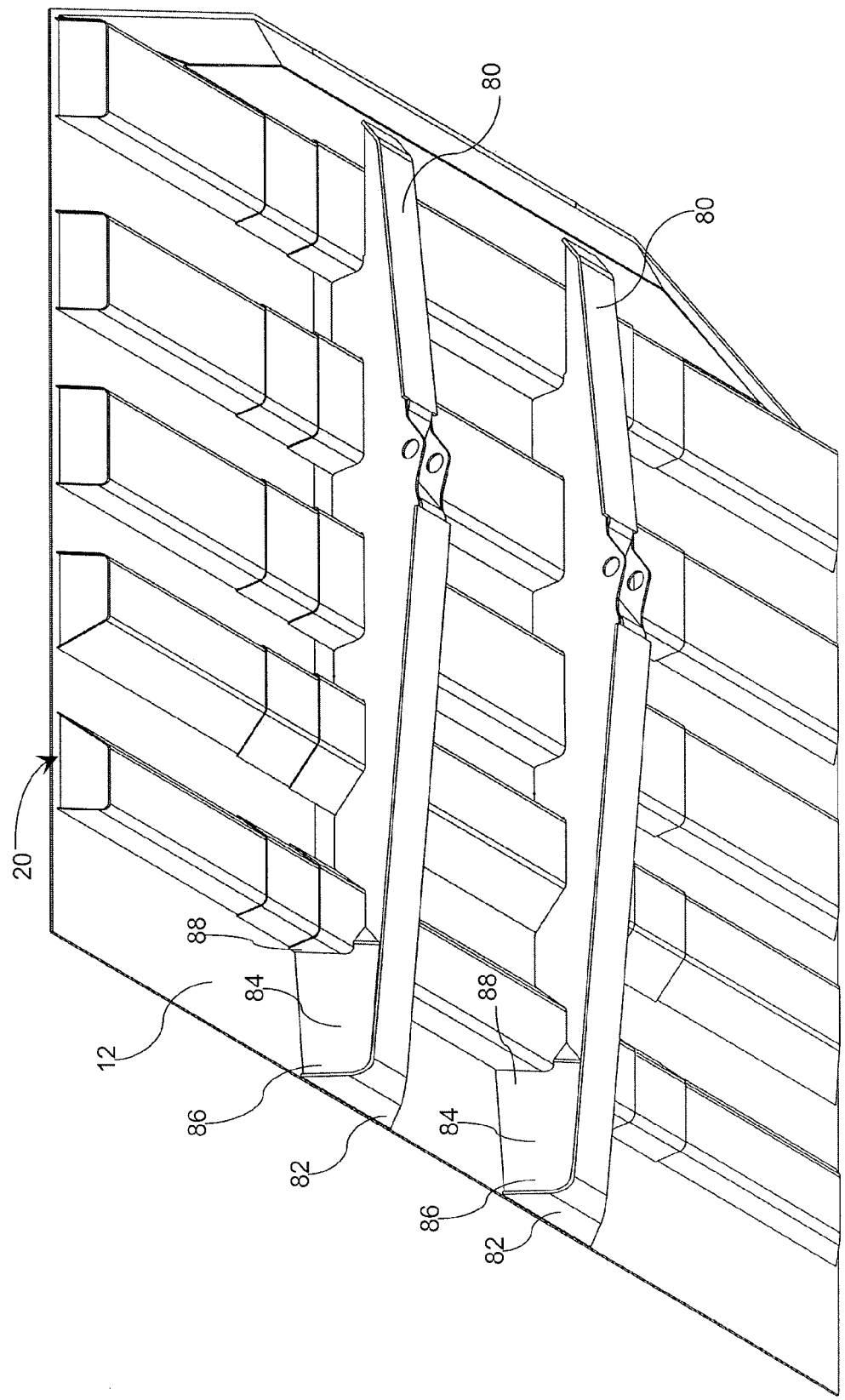
FIG. 12 shows a bottom isometric view of a truck body floor with front frame rail support plates.

FIG. 12 shows another embodiment that includes the tapered frame rail plates shown in FIG. 11. In addition, the embodiment shown in FIG. 12 also includes frame rail support plates 84, which extend from the frame rail plate 80 up to the floor plate 12 at the front of the truck body floor. In a specific embodiment, the frame rail support plates 84 are disposed at a front end of the truck body floor 4 and include a front edge 86 that extends along an edge of the tapered section 82 of the frame rail plate 80. Further, the rear edge 88 of each frame rail support plate 84 can be shaped to fit against the front-most bolster structure 20 and/or to the floor plate 12.

In another embodiment, the tapered frame rail plates 80 and frame rail support plates 84 can be used in combination with the super stiffeners 50 shown in FIG. 8, with the half funnels 60 shown in FIGS. 9A and 9B, with the hoist mounts 70 shown in FIGS. 10A and 10B, or any combination thereof. A combination including all five of these features, along with additional features, is shown for a truck body having a one piece floor construction in FIGS. 2 and 3, and for a truck body having a three piece floor construction in FIGS. 5 and 6.

Figure 13A:
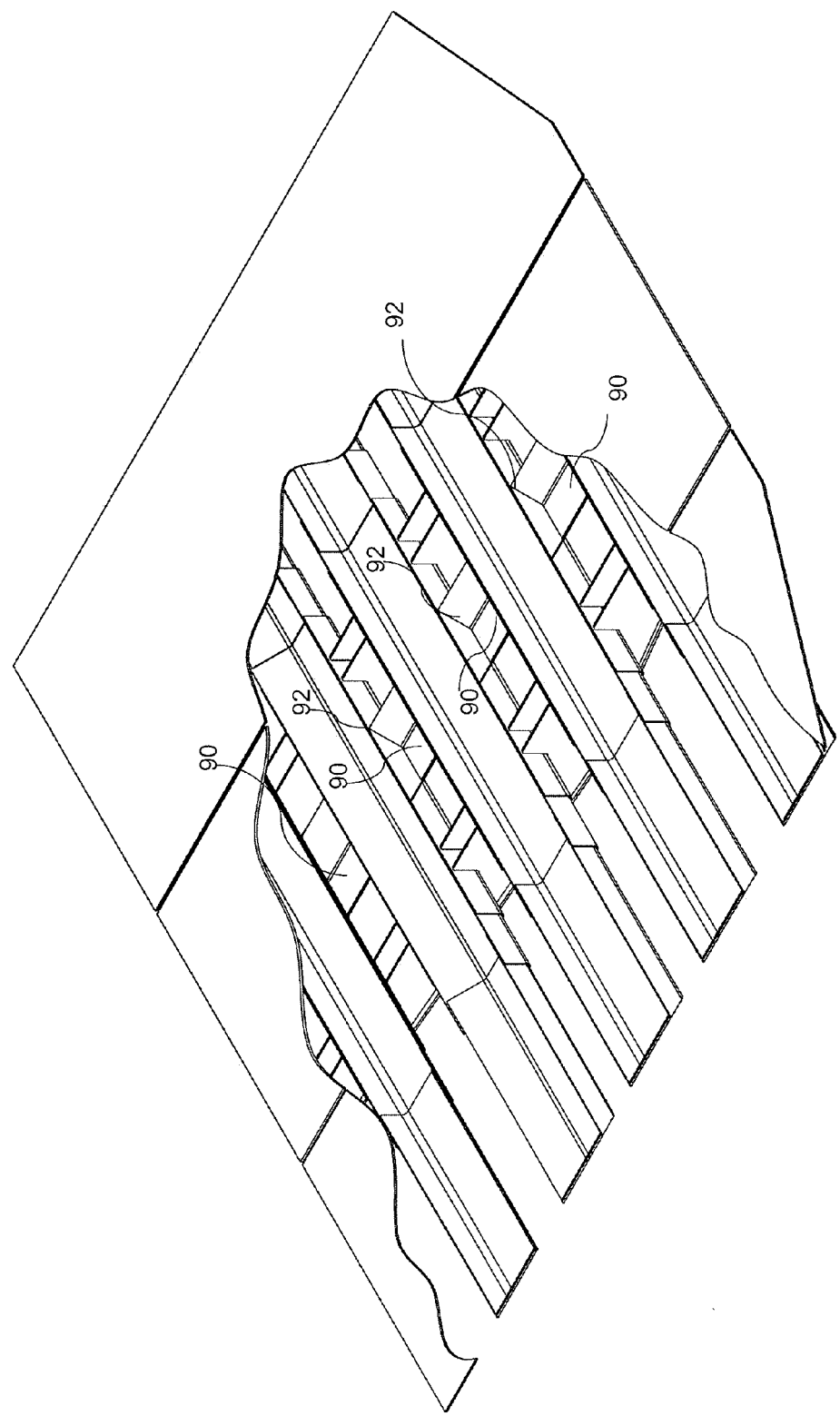
FIG. 13A shows a top perspective view of a truck body floor with front to rear bolsters.
Figure 13B:
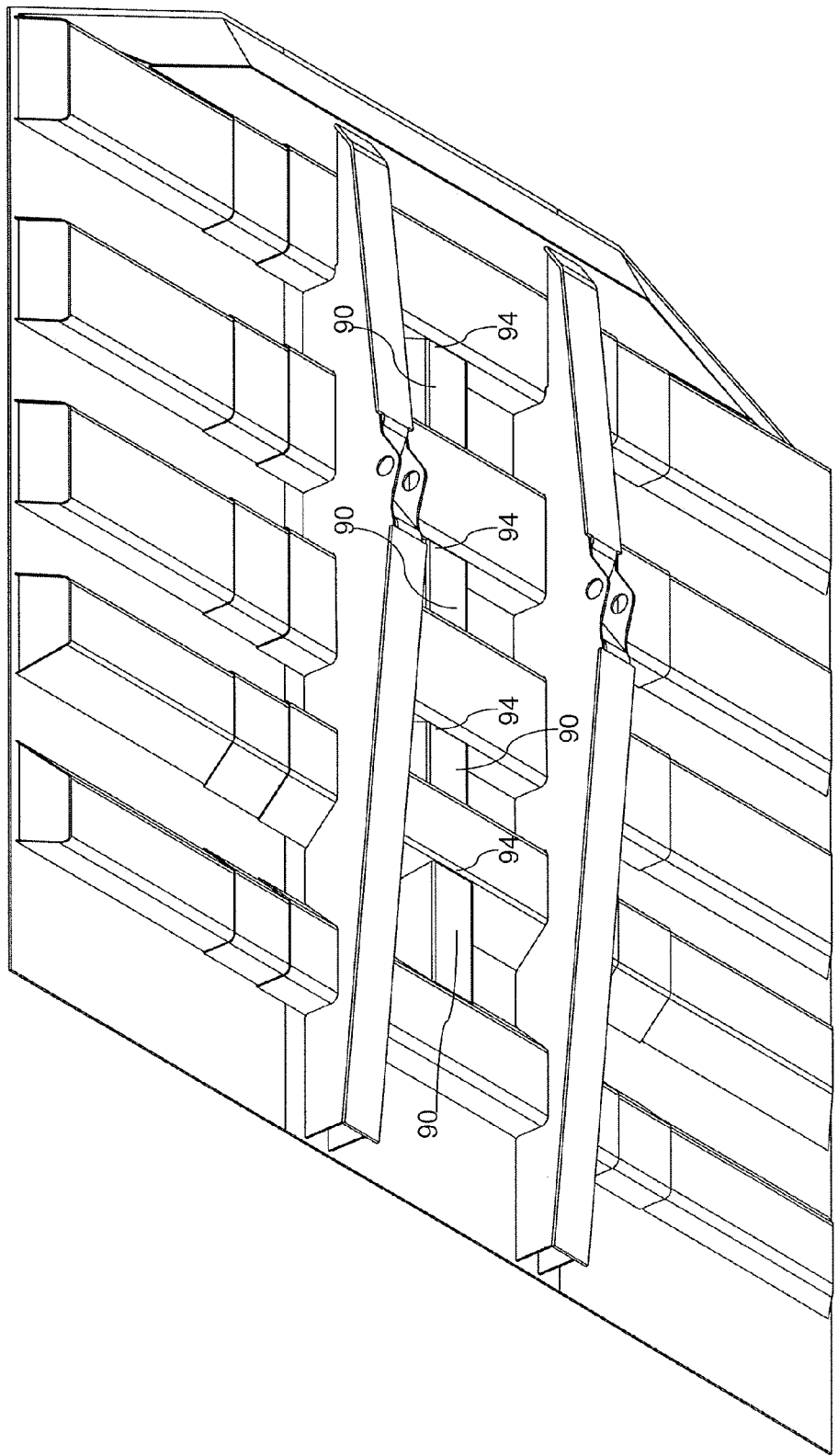
FIG. 13B shows a bottom perspective view of the truck body floor of FIG. 13A with front to rear bolsters.

FIGS. 13A and 13B shows another embodiment of a truck body floor 4 that includes front to rear bolsters 90. The front to rear bolsters 90 are each disposed between two adjacent bolster structures 20 and include front and rear edges 92, 94 that attach to the respective neighboring bolster structure. In the illustrated embodiment, the front to rear bolsters 90 are disposed at the center of the truck body floor 4 and configured as a channel with outward tapering flanges these front to rear bolsters 90 can also be disposed at the sides of the truck body floor. It is also possible to use channels with vertical flanges or to include the front to rear bolsters 90 only between certain pairs of bolster structures 20.

In another embodiment, the front to rear bolsters 90 can be used in combination with the super stiffeners 50 shown in FIG. 8, with the half funnels 60 shown in FIGS. 9A and 9B, with the hoist mounts 70 shown in FIGS. 10A and 10B, the tapered frame rail plates 80 shown in FIG. 11, the frame rail support plates 84 shown in FIG. 12, or any combination thereof. A combination including all of these features, along with additional features, is shown for a truck body having a one piece floor construction in FIGS. 2 and 3, and for a truck body having a three piece floor construction in FIGS. 5 and 6.

Figure 14A:
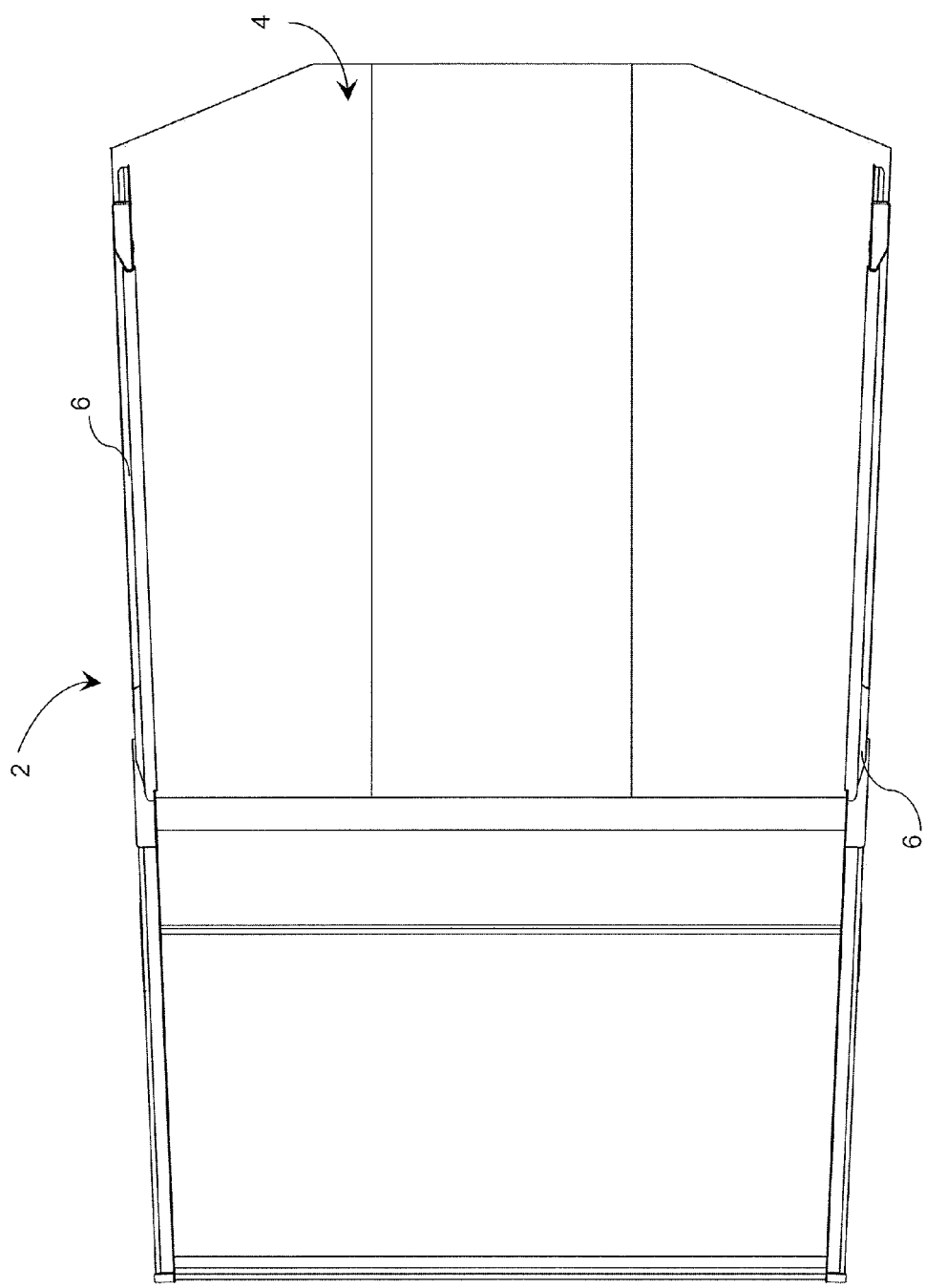
FIG. 14A shows a top view of a truck body with a front to rear tapered truck body floor.
Figure 14B:
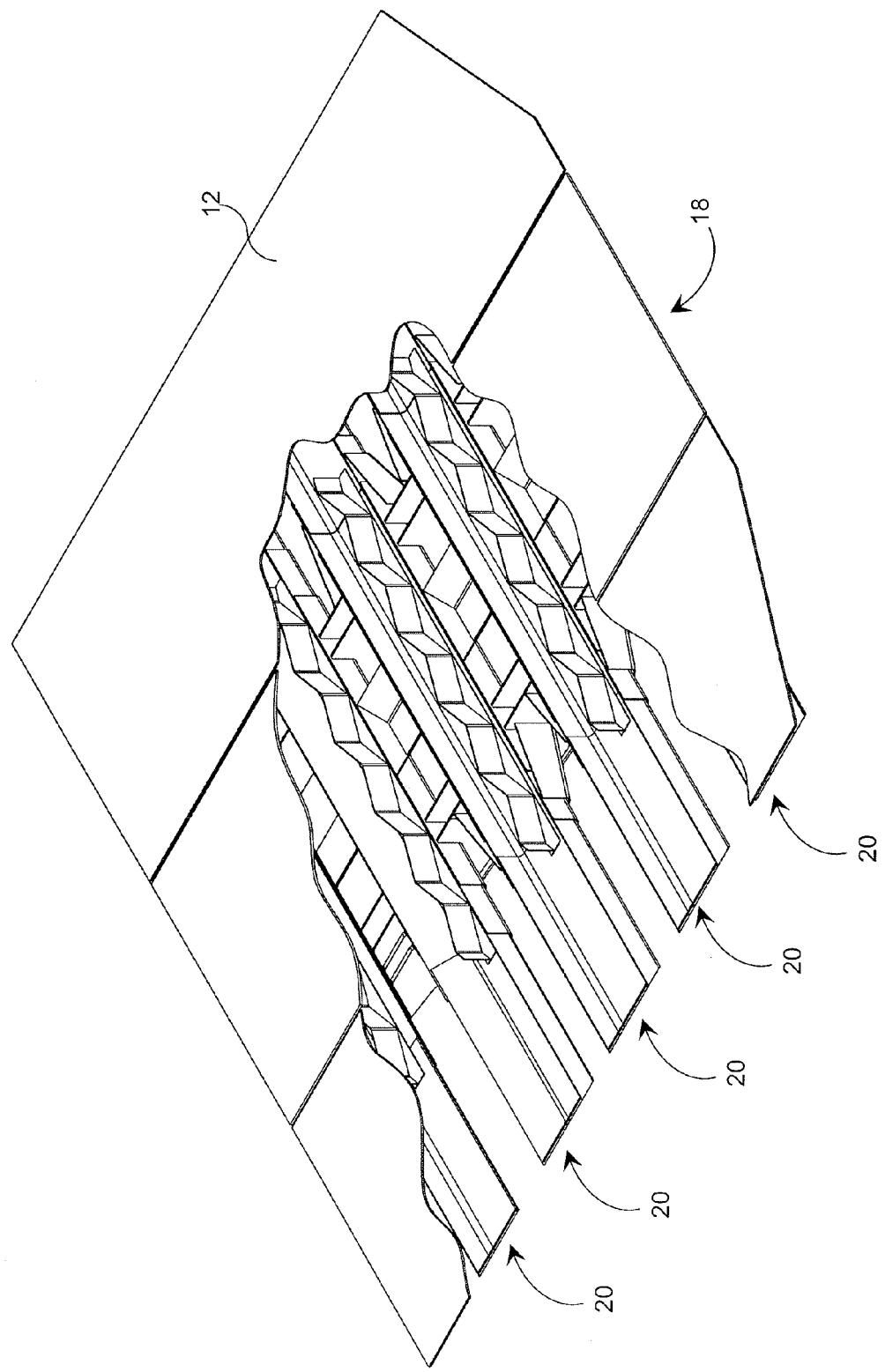
FIG. 14B shows a perspective view the truck body floor of the truck body of FIG. 14A.
Figure 14C:
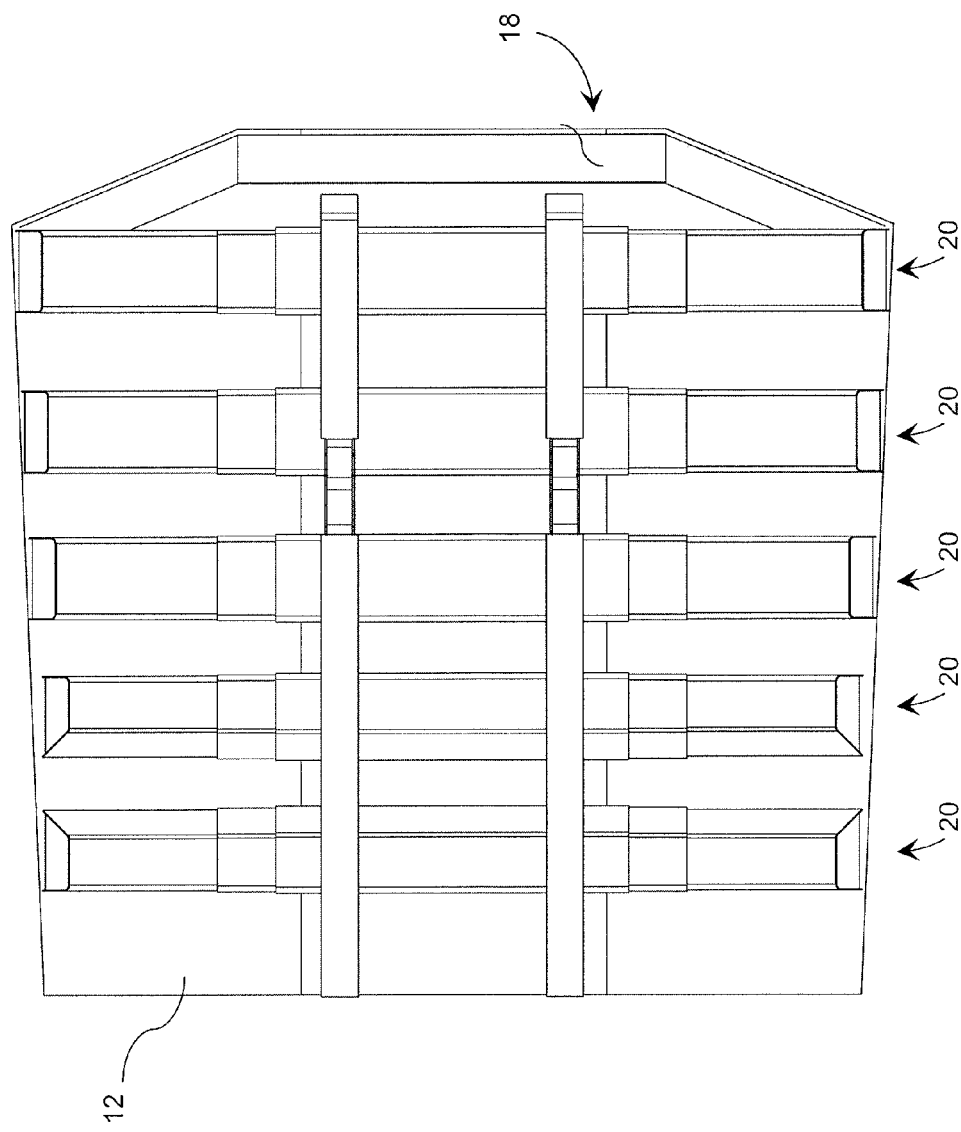
FIG. 14C shows a bottom view of the truck body floor of FIG. 14A.

FIGS. 14A-C show an embodiment of a truck body 2 that has a tapered construction that widens toward the rear end of the truck body 2. Thus, the truck body floor 4 tapers outward from the front of the truck body to the rear of the truck body and the side walls 6 move away from one another toward the rear of the truck body 2. This tapering of the truck body 2 enables easier unloading of material held in the truck body 2 when the truck body is lifted to dump the material. Due to the outward tapering of the side walls 6, the walls move away, in relative terms, from the material as it moves toward the rear end of the truck body. Accordingly, frictional forces at the side walls are reduced, which eases removal of the material and minimizes any sidewall wear.

To compensate for the outward tapering of the truck body 2, the bolster structures 20 can also widen from the front of the truck body to the rear of the truck body, such that the bolster structure 20 at the front of the truck body is shorter than the bolster structure at the rear of the truck body, as shown in FIG. 14C.

While the invention has been particularly shown and described with reference to preferred embodiments thereof, it will be understood by those skilled in the art that various changes in form and details may be made therein without departing from the spirit and scope of the invention.

The invention claimed is:

1. A truck body floor construction comprising:
 a truck body floor structure including:
  two frame rails extending along a longitudinal length of the truck body floor, and
  a plurality of bolster structures attached to both of the two frame rails and extending across a width of the truck body floor, the plurality of bolster structures including at least one layered bolster structure including an inner bolster and an outer bolster that is at least partially flush with and attached to the inner bolster, each of the inner bolster and outer bolster extending through both frame rails; and
 a floor plate that is attached to and supported by the truck body floor structure.

2. The truck body floor construction recited in claim 1, wherein the inner bolster of each layered bolster structure is formed in one piece and extends across an entire width of the truck body floor such that the truck body floor has a one-piece construction.

3. The truck body floor construction recited in claim 1, wherein the inner bolsters of each layered bolster structure are shorter than the width of the truck body floor, and
 wherein the layered bolster structures include interlocking outside bolsters attaching to ends of the inner bolsters.

4. The truck body floor construction recited in claim 3, wherein a portion of the interlocking outside bolsters extends into a corresponding portion of the inner bolsters.

5. The truck body floor construction recited in claim 1, wherein at least one of the bolster structures is configured as a channel, and
 wherein a super stiffener is disposed inside the channel, the super stiffener including a scalloped plate disposed in-between the floor plate and an inside of the channel.

6. The truck body floor construction recited in claim 1, further comprising at least one half-funnel extending from a side surface of a first of the frame rails to a surface of a respective bolster structure so as to distribute loading between the first frame rail and the respective bolster structure, the half-funnel including a tapered channel with an narrow end that fits tightly on a surface of the respective bolster structure and wide end configured to abut the side surface of the first frame rail.

7. The truck body floor construction recited in claim 1, wherein a pair of adjacent bolster structures of the plurality of bolster structures are configured as channels, each of the adjacent bolster structures including a web and two flanges,
   wherein opposing flanges of the adjacent bolster structures that face one another are each tapered so as to extend toward the opposing flange, and
   wherein the body floor structure includes at least one tapered hoist mount having tapered supports that abut the respective tapered flanges of the adjacent bolster structures.

8. The truck body floor construction recited in claim 1, wherein each of the frame rails includes a frame rail plate extending along a bottom of the frame rail, and
   wherein each frame rail plate includes a tapered section extending upward and tapering outward at a front end of the respective frame rail.

9. The truck body floor construction recited in claim 8, further comprising at least one frame rail support plate extending from a respective frame rail to the floor plate.

10. The truck body floor construction recited in claim 9, wherein an edge of the frame rail support plate abuts the tapered section of the frame rail plate.

11. The truck body floor construction recited in claim 1, further comprising at least one front to rear bolster extending in the longitudinal direction of the truck body floor, parallel with and between the two frame rails, and between two of the plurality of bolster structures.

12. The truck body floor construction recited in claim 1, wherein the truck body floor tapers outward along the longitudinal direction of the truck body floor from a front of the truck body floor to a rear of the truck body floor, and wherein a first bolster structure, that is closer to the rear of the truck body floor than a second bolster structure, is longer than the second bolster structure.

13. A truck body comprising:
   a truck body floor including:
      two frame rails extending along a longitudinal length of the truck body floor,
      a plurality of bolster structures attached to both of the two frame rails and extending across a width of the truck body floor, the plurality of bolster structures including at least one layered bolster structure including an inner bolster and an outer bolster that is at least partially flush with and attached to the inner bolster; and
      a floor plate that is attached to and supported by the truck body floor frame;
   a front wall extending upward from a front of the truck body floor; and
   two side walls extending upward from opposing sides of the truck body floor and adjacent to opposing sides of the front wall.

14. A method of providing a truck body floor, the method comprising:
   constructing a central truck body floor segment at a first location, the central truck body floor segment including:
      two frame rails extending in a longitudinal direction of the central truck body floor segment,
      a plurality of bolster structure central segments, at least one of the plurality of bolster structure central segments including an inner bolster and an outer bolster that is at least partially flush with and attached to the inner bolster, and
      a central floor plate section supported by the frame rails and bolster structure central segments; and
   sending the central truck body floor segment to a second location for assembling the truck body floor.

15. The method recited in claim 14, further comprising:
   constructing a pair of outside truck body segments at the first location, each of the outside truck body segments including:
      a plurality of interlocking outside bolsters that are each configured for attachment to a respective central bolster structure segment of the central truck body floor segment, and
      an outside floor plate section attached to the plurality of interlocking outside bolsters; and
   sending the pair of outside truck body segments to the second location for assembly with the central truck body floor segment.

16. The method recited in claim 14, further comprising:
   receiving the central truck body floor segment at the second location; and
   assembling the truck body floor by:
      attaching an interlocking outside bolster to each end of at least one of the central bolster structure segments so as to construct a bolster structure extending across a full width of the truck body floor, and
      attaching outside floor plate sections to the interlocking outside bolsters so as to construct a complete truck body floor plate extending across a full width of the truck body floor.

17. The method recited in claim 15, further comprising:
   receiving the central truck body floor segment at the second location;
   receiving the outside truck body segments at the second location;
   attaching the outside truck body segments to opposing sides of the central truck body floor segment at the second location, by connecting the interlocking outside bolsters of the outside truck body segments to the bolster structure central segments.

18. A truck body floor construction comprising:
   a truck body floor including:
      two frame rails extending along a longitudinal length of the truck body floor, and
      a plurality of bolster structures extending through both of the two frame rails and across a width of the truck body floor, the plurality of bolster structures including at least one bolster structure having a thicker central portion at a center of the truck body floor that has a larger thickness than two outer portions at respective lateral sides of the truck body floor, the thicker central portion extending through both frame rails; and
   a floor plate that is attached to and supported by the truck body floor frame.

19. The method recited in claim 17, wherein the outside truck body segments include respective truck body side walls.

* * * * *

UNITED STATES PATENT AND TRADEMARK OFFICE
CERTIFICATE OF CORRECTION

PATENT NO. : 8,770,651 B2  
APPLICATION NO. : 13/589805  
DATED : July 8, 2014  
INVENTOR(S) : LeRoy G. Hagenbuch Page 1 of 1

It is certified that error appears in the above-identified patent and that said Letters Patent is hereby corrected as shown below:

*In the Claims*

Claim 5, column 12, line 62:

"in-" should be omitted.

Claim 13, column 13, line 52:

"frame" should be omitted.

Claim 18, column 14, line 59:

"frame" should be omitted.

Signed and Sealed this  
Seventh Day of October, 2014

Michelle K. Lee  
*Deputy Director of the United States Patent and Trademark Office*